(12) United States Patent
van Riel et al.

(10) Patent No.: US 10,956,216 B2
(45) Date of Patent: Mar. 23, 2021

(54) FREE PAGE HINTING WITH MULTIPLE PAGE SIZES

(71) Applicant: Red Hat, Inc., Raleigh, NC (US)

(72) Inventors: Henri Han van Riel, Merrimack, NH (US); Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 80 days.

(21) Appl. No.: 15/692,346

(22) Filed: Aug. 31, 2017

(65) Prior Publication Data

US 2019/0065267 A1 Feb. 28, 2019

(51) Int. Cl.
*G06F 9/50* (2006.01)
*G06F 12/0882* (2016.01)
*G06F 12/0884* (2016.01)
*G06F 9/455* (2018.01)

(52) U.S. Cl.
CPC ........ *G06F 9/5016* (2013.01); *G06F 9/45558* (2013.01); *G06F 12/0882* (2013.01); *G06F 12/0884* (2013.01); *G06F 2009/45579* (2013.01); *G06F 2009/45583* (2013.01)

(58) Field of Classification Search
CPC ............... G06F 9/5016; G06F 12/0882; G06F 12/0884; G06F 2009/45583; G06F 9/5022; G06F 9/45558
See application file for complete search history.

(56) References Cited

U.S. PATENT DOCUMENTS

| | | |
|---|---|---|
| 6,598,143 B1 | 7/2003 | Baker et al. |
| 7,337,296 B2 | 2/2008 | Noel et al. |
| 7,433,951 B1 | 10/2008 | Waldspurger |
| 7,516,292 B2 | 4/2009 | Kimura |
| 8,086,811 B2 | 12/2011 | Gainey, Jr. |
| 8,255,658 B2 | 8/2012 | Adachi |
| 8,583,875 B1 | 11/2013 | Garthwaite et al. |
| 8,667,496 B2 | 3/2014 | Levin |
| 8,689,007 B2 | 4/2014 | Schunter et al. |
| 8,789,034 B1 | 7/2014 | Emelyanov |
| 8,856,194 B2 | 10/2014 | Chen |
| 8,875,295 B2 | 10/2014 | Lutas |

(Continued)

OTHER PUBLICATIONS

Riel, Rik van. "Re: [patch: 0/6] Guest page hinting". Posted Mar. 27, 2009_ <https://lkml.org/lkml/2009/3/27/503> and <https://lkml.org/lkml/2009/3/27 /503> in thread <https://lkml.org/lkm 1/2009/3/27 /223>.

(Continued)

*Primary Examiner* — Andrew J Cheong
(74) *Attorney, Agent, or Firm* — Lowenstein Sandler LLP

(57) ABSTRACT

Systems and methods for memory page hints that account for multiple page sizes. An example method may comprise: determining, by a processing device executing a guest operating system, that a memory page size of the guest operating system is different from a memory page size of a hypervisor; adding, by the guest operating system, a guest memory page released by the guest operating system to a set of guest memory pages; determining in view of the memory page size of the hypervisor that the set of guest memory pages fills a hypervisor memory page; and providing an indication to the hypervisor that the hypervisor memory page is available for reuse.

20 Claims, 10 Drawing Sheets

(56) References Cited

U.S. PATENT DOCUMENTS

| | | | |
|---|---|---|---|
| 8,943,259 | B2 | 1/2015 | Weissman |
| 9,069,782 | B2 | 6/2015 | Yang |
| 9,147,078 | B2 | 9/2015 | Muff |
| 9,183,157 | B2 | 11/2015 | Qiu |
| 9,201,682 | B2 | 12/2015 | Cheng |
| 9,251,090 | B1 | 2/2016 | Borthakur et al. |
| 9,268,678 | B2 | 2/2016 | Tuch et al. |
| 9,280,458 | B2 | 3/2016 | Durrant |
| 9,280,486 | B2 | 3/2016 | Riel |
| 9,298,377 | B2 | 3/2016 | Baskakov |
| 9,355,023 | B2 | 5/2016 | Badam et al. |
| 9,361,218 | B2 | 6/2016 | Ahmad et al. |
| 9,390,028 | B2 | 7/2016 | Gordon |
| 9,442,754 | B1 | 9/2016 | Tsirkin |
| 9,448,928 | B2 | 9/2016 | Ahad |
| 9,459,900 | B2 | 10/2016 | Tsirkin |
| 9,507,540 | B1 | 11/2016 | Adogla |
| 9,509,501 | B2 | 11/2016 | Bursell |
| 9,524,233 | B2 | 12/2016 | Venkatasubramanian |
| 9,552,233 | B1 | 1/2017 | Tsirkin |
| 9,619,263 | B2 | 4/2017 | Broas |
| 9,672,062 | B1 | 6/2017 | Tsirkin et al. |
| 10,083,058 | B2 | 9/2018 | Tsirkin |
| 2007/0016904 | A1 | 1/2007 | Adlung |
| 2008/0307188 | A1 | 12/2008 | Franaszek et al. |
| 2009/0307447 | A1 | 12/2009 | Jacobs et al. |
| 2010/0070678 | A1 | 3/2010 | Zhang |
| 2010/0095074 | A1* | 4/2010 | Ganesh ............ G06F 12/08 711/154 |
| 2010/0169536 | A1 | 7/2010 | Shedel et al. |
| 2010/0325268 | A1 | 12/2010 | Muthiah |
| 2011/0154133 | A1 | 6/2011 | Ganti et al. |
| 2011/0246767 | A1 | 10/2011 | Chaturvedi et al. |
| 2011/0320682 | A1* | 12/2011 | McDougall ........ G06F 12/023 711/6 |
| 2012/0079479 | A1* | 3/2012 | Hakewill ........... G06F 9/45558 718/1 |
| 2012/0239850 | A1 | 9/2012 | Qiu |
| 2012/0317331 | A1 | 12/2012 | Broas |
| 2013/0145073 | A1* | 6/2013 | Tuch .................. G06F 12/023 711/6 |
| 2013/0290596 | A1* | 10/2013 | Corrie ................ G06F 12/023 711/6 |
| 2013/0339568 | A1 | 12/2013 | Corrie |
| 2015/0039838 | A1 | 2/2015 | Tarasuk-Levin |
| 2015/0089010 | A1 | 3/2015 | Tsirkin |
| 2015/0199209 | A1 | 7/2015 | Tsirkin |
| 2015/0242159 | A1 | 8/2015 | Tsirkin |
| 2015/0301946 | A1 | 10/2015 | Guo |
| 2016/0077965 | A1 | 3/2016 | Gaonkar |
| 2016/0078585 | A1 | 3/2016 | Sheldon |
| 2016/0085695 | A1 | 3/2016 | Leslie-Hurd et al. |
| 2016/0253201 | A1 | 9/2016 | Zhang |
| 2016/0350236 | A1 | 12/2016 | Tsirkin |
| 2016/0350244 | A1 | 12/2016 | Tsirkin |
| 2017/0108914 | A1 | 4/2017 | Chun et al. |
| 2017/0206175 | A1 | 7/2017 | Sliwa et al. |
| 2018/0095899 | A1 | 4/2018 | Durham et al. |

OTHER PUBLICATIONS

Corbet. "Guest page hinting". Posted Sep. 6, 2006. <http://lwn.net/Articles/198380/>. Comment posted by rvdheij on Sep. 14, 2006.
Waldspurger, C.A., "Memory Resource Management in VMware ESX Server," Proceedings of the 5th Symposium on Operating Systems Design and Implementation, Boston, Massachusetts, Dec. 9-11, 2002, 15 pages.
Scwidefsky, M. et al., "Collaborative Memory Management in Hosted Linux Environments," (IBM), Linux Symposium, Ottawa, Canada, Jul. 19-22, 2006, 16 pages.
Van Riel, R., "KVM Performance Optimizations Internals," The Red Hat Summit, Boston, Massachusetts, May 5, 2011, 25 pages.
Corbet, J., "Linux Filesystem, Storage, and Memory Management Summit, Day 2," 2011 Linux Filesystem, Storage and Memory Management Summit, San Francisco, California, Apr. 5, 2011, 9 pages.
"The Role of Memory in VMware ESX Server 3- Information Guide," VMware, Inc. Sep. 26, 2006, 11 pages.
Schwidefsky, M., "Linux Kernel Archive: [patch 0/6] [rfc] guest page hinting version 5" (May 11, 2007), downloaded on Jul. 28, 2011 from http://llkml.indiana.edu/hypermail/linux/kernel/0705.1/21 01 html, 2 pages.
Schwidefsky, M., "Linux Kernel Archive: [patch 1/6] Guest page hinting: core+ volatile page cache," (Jun. 28, 2007), downloaded on Jul. 28, 2011 from http://comments.gmane.org/gmane.comp.emulators.kvm .devel/4314, 1 page.
Schwidefsky, M., "Linux Kernel Archive: [patch 2/6] Guest page hinting," (May 11, 2007), downloaded on Jul. 28, 2011 from http://llkml.indiana.edu/hypermail/linux/kernel/0705.1/2100html, 8 pages.
Schwidefsky, M., "Linux Kernel Archive: [patch 3/6] Guest page hinting: mlocked pages," (May 11, 2007), downloaded on Jul. 28, 2011 from http://llkml.indiana.edu/hypermail/linux/kernel/0705.1/21 02html, 3 pages.
Schwidefsky, M., "Linux Kernel Archive: [patch 4/6] Guest page hinting: writable page table entries," (May 11, 2007), downloaded on Jul. 28, 2011 from http://llkml.indiana.edu/hypermail/linux/kernel/0705.1/21 04html, 7 pages.
Schwidefsky, M., "Linux Kernel Archive: [patch 5/6] Guest page hinting: minor fault optimization," (May 11, 2007), downloaded on Jul. 28, 2011 from http://llkml.indiana.edu/hypermail/linux/kernel/0705.1/21 03html, 5 pages.
Schwidefsky, M., "Linux Kernel Archive: [patch 6/6] Guest page hinting: s390 support," (May 11, 2007), downloaded on Jul. 28, 2011 from http://lkml.indiana.edu/hypermail/linux/kernel/0705.1 /21 05html, 14 pages.
Schwidefsky, M., "Guest page hinting: cover page." Published Sep. 6, 2006. <http://lwn.net/Articles/198384/>.
"Kernel Zeroes Memory?" Stack Overflow, 3 pages, downloaded from http://stackoverflow.com/questions/6004816/kernel-zeroes-memory on Sep. 1, 2016.
Hosterman, C. "Pure Storage FlashArray and Re-Examining VMware Virtual Disk Types," Cody Hosterman, FlashArray, VAAI, VMware, XCopy, Jul. 23, 2014, 9 pages, downloaded from http://www.codyhosterman.com/2014/07/pure-storage-flasharray-and-re-examining-vmware-virtual-disk-types/ on Sep. 1, 2016.
Chiang et al. "Working Set-based Physical Memory Ballooning," 10th International Conference on Autonomic Computing (ICAC '13), USENIX Association, pp. 95-99.
"Performance Best Practices for VMware vSphere® 5.5" VMware, Inc., Sep. 19, 2013, 90 pages.
Improving host swapping using adaptive prefetching and paging notifier; Chen, Wenzhi et al; Proceedings of the 19th ACM International Symposium on High Performance Distributed Computing; Jun. 21-25, 2010; pp. 300-303 (4 pages).
Denneman, Frank, "Impact of Memory Reservation", Dec. 8, 2009, http://frankdenneman.nl/2009/12/08/impact-of-memory-reservation,18 pages.
"Bug 995420—Qemu-Kvm Process do not Release Memory(RES) after Guest Do Stress Test", 2013, https://bugzilla.redhat.com/show_bug.cgi?id=995420/.
Riel, Rik van, "Guest Memory Overcommit—Page Hinting, Resizing & More", Red Hat, 2011, http://www.linux-kvm.org/images/f/ff/2011-forum-memory-overcommit.pdf, 14 pages.
"8.2. Memory Tuning on Virtual Machines", https://access.redhat.com/documentation/en-US/Red_Hat_Enterprise_Linux/7/html/Virtualization_Tuning_and_Optimization_Guide/sect-Virtualization_Tuning_Optimization_Guide-Memory-Tuning.html, 6 pages.
Agarwal, Neha & Wenisch, Thomas F., "Thermostat: Application-transparent Page Management for Two-tiered Main Memory", Apr. 12, 2017, University of Michigan, http://web.eecs.umich.edu/~twenisch/papers/asplos17.pdf, 14 pages.
Huang, Jian, Qureshi, Moinuddin K., Schwan, Karsten, "An Evolutionary Study of Linux Memory Management fo Fun and Profit",

(56) References Cited

OTHER PUBLICATIONS

Jun. 24, 2016, Georgia Institute of Technology, https://www.usenix.org/system/files/conference/atc16/atc16_paper-huang.pdf, 15 pages.

* cited by examiner

FREE PAGE HINTING WITH MULTIPLE PAGE SIZES

TECHNICAL FIELD

The present disclosure is generally related to virtualized computer systems, and more particularly, to memory allocation in virtualized computer systems.

BACKGROUND

Virtualization allows multiplexing of an underlying host machine between different virtual machines. The host machine allocates a certain amount of its resources to each of the virtual machines. Each virtual machine is then able to use the allocated resources to execute applications, including operating systems (referred to as guest operating systems). An executable layer that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer.

A host machine can accommodate more virtual machines than the size of its physical memory allows. Using virtual memory techniques, the host machine can give each virtual machine the impression that it has a contiguous address space, while in fact the memory used by the virtual machine may be physically fragmented and even overflow to disk storage. When the host machine needs to free up memory, it selects memory pages that have been assigned to virtual machines, and pages out the contents of those memory pages to disk storage. When the virtual machines attempt to access those memory pages, the host machine pages in the content of the memory page by reading the content stored in disk storage and writing the content back to memory. Paging out and paging in memory pages requires input/output (I/O) operations, which can cause significant delay for the virtual machine.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
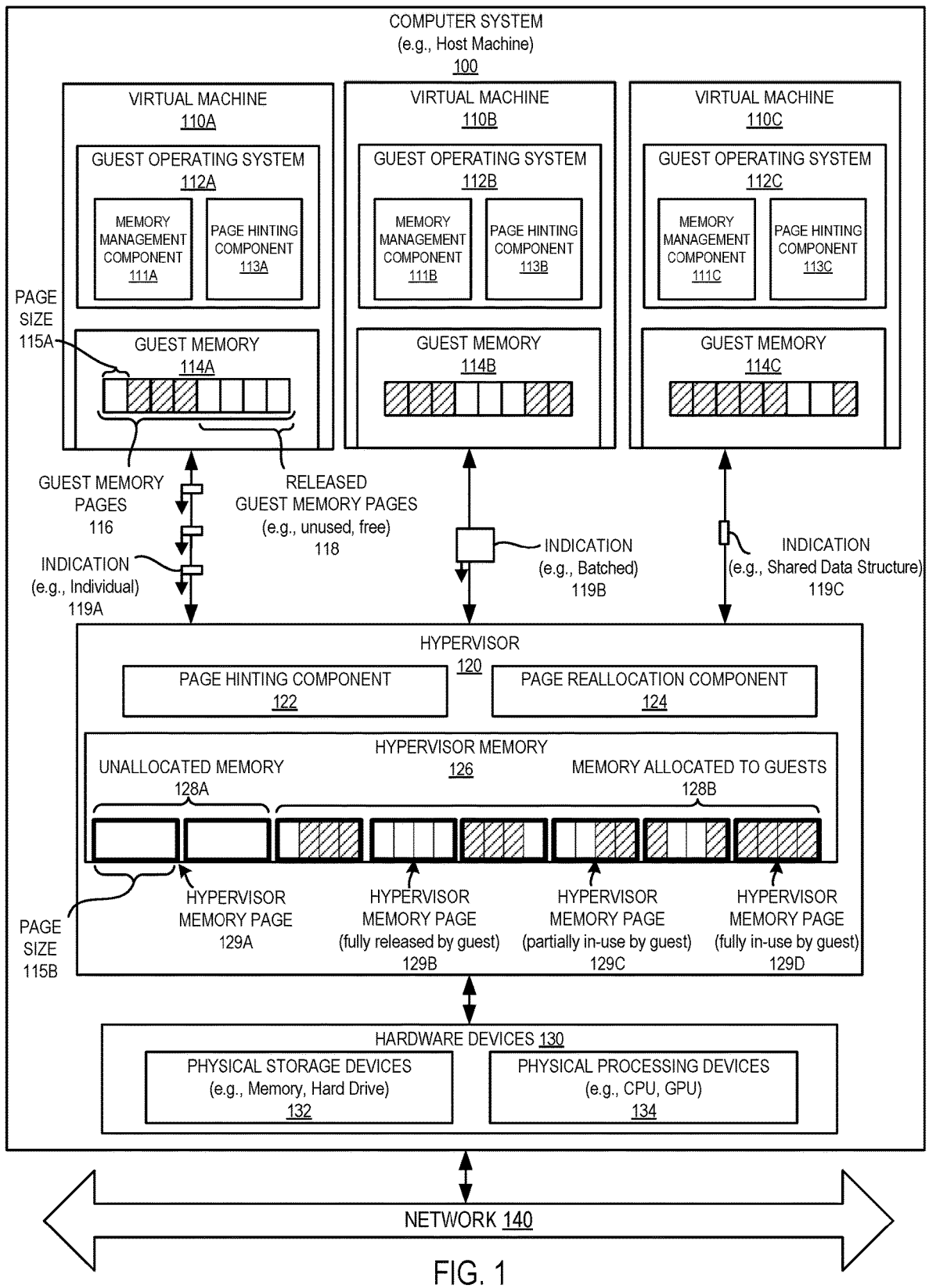
FIG. 1 depicts a high-level block diagram of an example computer system architecture, in accordance with one or more aspects of the present disclosure.

Many modern virtualized computer systems include overlapping storage management features that manage the same underlying physical storage resources. For example, a hypervisor and a guest operating system may both include storage management functionality that implements a caching mechanism across different storage devices. The caching mechanism may involve memory pages that are paged to or from a persistent storage. The hypervisor and guest operating systems may function separately and a hypervisor may allocate storage to a virtual machine but may be unaware of which portions of storage are in use by a guest operating system executing on the virtual machine. Knowledge of the guest operating system's use of the storage may be beneficial to a hypervisor managing memory because portions of storage that have been released by the guest operating system may be reused by the hypervisor without the overhead of copying the data to and from persistent storage (e.g., page swapping).

Virtualized computer systems have evolved to share information about the use of memory between the guest operating system and the hypervisor. For example, a guest operating system may share memory use information with the hypervisor by transmitting messages that identify particular guest memory pages that are not being used by the guest operating system. The hypervisor may store the memory use information and subsequently access the memory use information when determining a portion of memory to evict. In some configurations, the guest operating system and the hypervisor may use the same size memory pages and when a guest memory page is released it may indicate that a corresponding memory page of the hypervisor is no longer being used by the guest operating system. In other configurations, the guest operating system and the hypervisor may use memory pages that are different sizes. In this situation, a guest memory page that is no longer in use may not necessarily correspond to memory page of the hypervisor that is no longer in use by the guest operating system. This is because the memory page of the hypervisor may be larger than the guest memory page and another portion of the hypervisor page may still be in use by the guest operating system. Messages that indicate only a portion of a hypervisor's memory page has been released may not be useful if the remaining portion of the hypervisor's memory page remains in use.

Aspects of the present disclosure address the above and other deficiencies by providing technology that aligns the memory use information of guest memory pages with underlying hypervisor memory pages when a virtualized computer system uses multiple memory page sizes. In one example, the technology may be integrated within a guest operating system and the guest operating system may determine that a memory page size of the guest operating system is different from a memory page size of a hypervisor. As the guest operating system releases guest memory pages the guest operating system may add the released guest memory pages to a set of pages. The guest operating system may determine based on the memory page size of the hypervisor whether the set of released guest memory pages fills a memory page of the hypervisor. If the set does not fill a memory page of the hypervisor memory page, the guest operating system may avoid (e.g., wait) to send a message to the hypervisor. If the set does fill a memory page of the hypervisor, the guest operating system may provide an indication to the hypervisor that the memory page is available for reuse. In another example, the technology may be integrated within a hypervisor. The hypervisor may provide a memory page size of the hypervisor to a guest operating system. The memory page size of the hypervisor may be larger than a memory page size of the guest operating system. The hypervisor may determine that a memory page of the hypervisor comprises a plurality of guest memory pages that have been released by the guest operating system and that the memory page remains allocated to a virtual machine executing the guest operating system. When the hypervisor determines it needs to recapture (e.g., evict) memory, the hypervisor may reallocate a hypervisor memory page that is unused by the guest operating system to avoid having to copy content of the hypervisor memory page to persistent storage (e.g., backing store).

The systems and methods described herein include technology that enhances the memory management of virtualized computer systems. In particular, aspects of the present disclosure provide technology that enables a guest operating system to detect when the guest memory pages released by a guest operating system occupy an entire memory page of the hypervisor. This may enable the guest operating system to delay informing the hypervisor until a hypervisor memory page is completely released (e.g., unused) by a guest operating system and therefor avoid informing the hypervisor when only a portion of the hypervisor memory page is released. This may reduce the quantity of communications occurring between the guest operating system and the hypervisor, which may reduce the computing resources (e.g., processing power, Input/Output) consumed by virtual machines. Virtual machines that consume less computing resources may enable a host machine to support more virtual machines.

Various aspects of the above referenced methods and systems are described in details herein below by way of examples, rather than by way of limitation. The examples provided below discuss a virtualized computer system that has a hypervisor without an underlying host operating system (e.g., bare metal hypervisor), but other examples may include a hypervisor and host operating system (not shown).

FIG. 1 depicts an illustrative architecture of computer system 100, in accordance with an example of the present disclosure. It should be noted that other architectures for computer system 100 are possible, and that the implementation of a computer system utilizing embodiments of the disclosure are not necessarily limited to the specific architecture depicted. Computer system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include one or more virtual machines 110A-C, a hypervisor 120, hardware devices 130, and a network 140.

Virtual machines 110A-C may execute guest executable code that uses an underlying emulation of physical resources. The guest executable code may include one or more guest operating systems 112A-C that manage guest applications, guest device drivers, other executable code, or a combination thereof. Each of the virtual machines 110A-C may support hardware emulation, full virtualization, para-virtualization, operating system-level virtualization, or a combination thereof. Virtual machines 110A-C may have the same or different types of guest operating systems, such as Microsoft® Windows®, Linux®, Solaris®, etc. The virtual machines 110A-C may execute guest operating systems 112A-C that manage guest memory 114A-C respectively.

Guest operating systems 112A-C may include memory management components 111A-C and page hinting components 113A-C respectively. Components 111A-C and 113A-C may be separate components as shown or may be included into the same component. For example, the features provided by page hinting component may be integrated into the operations performed by memory management component of guest operating system 112A. Memory management component 111A-C may manage aspects of guest memory caching, such as the allocation and the release of portions of guest memory 114A-C. Page hinting components 113A-C may provide indications to hypervisor 120 of the memory pages that are released, allocated, or a combination thereof. In one example, page hinting components 113A-C may determine the status of hypervisor memory pages by analyzing a set of guest memory pages that have been released. Page hinting components 113A-C may notify the hypervisor when the set of guest memory pages reaches a threshold (e.g., buffer limit). The features of memory management component 111A-C and page hinting component 113A-C are discussed in more detail below in regards to the guest operating system of FIG. 2.

Guest memory 114A-C may be any virtual memory, logical memory, physical memory, other portion of memory, or a combination thereof for storing, organizing, or accessing data. Guest memory 114A-C may represent the portion of memory that is designated by hypervisor 120 for use by one or more respective virtual machines 110A-C. Guest memory 114A-C may be managed by guest operating system 112A-C and may be segmented into guest memory pages 116. Guest memory pages 116 may each include a contiguous or non-contiguous sequence of bytes or bits and may have a page size that is the same or different from a memory page size used by hypervisor 120. As shown in FIG. 1, the page size 115A of guest memory pages 116 and the page size 115B of hypervisor memory page 129A may be different. Each of the page sizes 115A and 115B may be a fixed-size, such as a particular integer value (e.g., 4 KB, 2 MB) or may be a variable-size that varies within a range of integer values. Each of the guest memory pages 116 may have a page size that is the same or different from the page size of an adjacent memory page. In one example, guest memory pages 116 may be memory blocks of a volatile or non-volatile memory device and may each correspond to an individual memory block, multiple memory blocks, or a portion of a memory block. Page size 115A may have a standard size (e.g., page size of 4 KB) and page size 115B may have an enlarged size (e.g., page size of 2 MB), which may be referred to as "huge pages."

Hypervisor memory 126 may be the same or similar to the guest memory but may be managed by hypervisor 120 instead of a guest operating system. Hypervisor memory 126 may include unallocated memory 128A, memory allocated to guests 128B, and memory allocated to hypervisor (not shown). The unallocated memory 128A may be memory pages that have not yet been allocated by hypervisor memory 126 or were previously allocated by hypervisor 120 and have since been deallocated (e.g., freed) by hypervisor 120. The memory allocated to guests may be the portion of hypervisor memory 126 that has been allocated by hypervisor 120 to virtual machines 110A-C and corresponds to guest memory 114A-C. Other portions of hypervisor memory may be allocated for use by hypervisor 120, a host operating system, hardware device, other module, or a combination thereof.

Hypervisor memory 126 may include hypervisor memory pages 129A-D, which may be in different states. The states may correspond to whether or not the hypervisor memory page has been allocated to a virtual machine and whether the hypervisor memory page is in use or is not in use by the virtual machine it is allocated to. Hypervisor memory page 129A may represent a memory page that is unallocated and hypervisor memory pages 129B-D may represent memory pages that have been allocated. Each of hypervisor memory pages 129B-D may be allocated by hypervisor 120 to a virtual machine but may include a different proportion of the memory page that is in use or not in use by the virtual machine it is allocated to. For example, hypervisor memory page 129B may be completely unused by the guest virtual machine that it is allocated to. Hypervisor memory page 129C may be partially in use and partially not in use by a guest virtual machine. Hypervisor memory page 129D may be fully in use by the virtual machine it is allocated to. As shown in FIG. 1, hypervisor memory page 129B may be fully released by guest operating system 112A and may correspond to released guest memory pages 118.

Released guest memory pages 118 may be any portion of guest memory 114A that has been released by the guest operating system. Releasing a memory page may involve a guest operating system instructing a virtual machine to execute a release operation that is the same or similar to freeing, deallocating, dereferencing, deleting, removing, other operation, or a combination thereof. In one example, a release operation may be initiated by the guest operating system in response to being notified that a memory page is no longer in use. This may occur when a process managed by the guest operating system makes a system call to the guest operating system to free the memory page. In another example, a release operation may be initiated by the guest operating system in response to determining the memory page is no longer in use by a process or thread managed by the guest operating system (e.g., garbage collection). In either example, releasing a memory page may result in the memory page being available for reuse by the guest operating system while remaining allocated to the virtual machine. Guest operating systems 112A-C may use indications 119A-C to indicate to hypervisor 120 that the memory pages are no longer in use (e.g., released).

Indications 119A-C may include one or more signals for indicating to hypervisor 120 that one or more memory pages of the hypervisor are not in use by the guest operating systems. The signal may be a message, interrupt, notification, exception, trap, other signal, or a combination thereof. Indications 119A-C may be transmitted from a virtual machine to the hypervisor, from the hypervisor to the virtual machine, or a combination thereof. Indications 119A-C may occur before, during, or after a guest memory page gets released by the guest operating system. The technology disclosed herein may implement one or more of indication 119A, indication 119B, indication 119C, other indication mechanism, or a combination thereof.

Indication 119A may be a message transmitted from virtual machine 110A to hypervisor 120 that includes identification data (e.g., identifier) of a memory page of a hypervisor or a range of memory pages of the hypervisor. Indication 119A may be one of a series of indications and each indication in the series may identify an individual memory page or an individual range of memory pages. Indication 119A may be transmitted in response to a particular memory page (e.g., hypervisor memory page 129B) being fully released by a guest virtual machine. In one example, each indication 119A may correspond to a system call, hypercall, other function call, or a combination thereof that is initiated by the guest operating system 112A.

Indication 119B may a batched message that is similar to indication 119A and may include multiple memory pages, memory page ranges, or a combination thereof. Batching the memory pages into indication 119B (e.g., batched message) may be advantageous because it may reduce the communications overhead (e.g., I/O) that occurs between virtual machines 110B and hypervisor 120. Indication 119B may be transmitted from virtual machine 110B to hypervisor 120 in response to a quantity of released memory pages satisfying (e.g., at, above, or below) one or more threshold quantities. The threshold quantities may be based on a size of the guest or hypervisor memory page and may be a particular quantity of memory pages (e.g., page count) or a quantity of space occupied by the memory pages (e.g., buffer space limit). The threshold quantities may include one or more values that may include integers, percentages, ratios, other values, or a combination thereof. The values may be relative to the size or limit of a guest memory page, hypervisor memory page, physical storage devices, heap, page, buffer, other data structure, or a combination thereof.

Indication 119C may include one or more signals that identify a shared data structure that represents the status of hypervisor memory pages. The shared data structure may indicate to hypervisor 120 which hypervisor memory pages include guest pages that are released, un-released, or a combination thereof. Indication 119C may include a first signal that may be sent prior to a guest memory page being released and one or more second signals may be sent after one or more memory pages are released. The first signal may be in the form of a message that is transmitted during an initialization of guest operating system 112C or initialization of a particular memory page management module of guest operating system 112C. The first signal may include information (e.g., reference, pointer) identifying the shared data structure that represents guest memory 114C. When the one or more memory pages are released, the respective virtual machine 110C may update the shared data structure to indicate to hypervisor 120 that one of the hypervisor memory pages is unused by the guest operating system 112C. Hypervisor 120 may subsequently access the shared data structure after memory pages are released. In one example, hypervisor 120 may listen for second signals (e.g., modification events) that indicate the shared data structure was updated. In another example, hypervisor 120 may not listen for second signals and may access the shared data structure when hypervisor 120 determines memory pages should be reallocated (e.g., memory page faults exceed a threshold or available memory pages fall below a threshold).

The shared data structure may be modified by one or more of the virtual machines and may be accessible to the hypervisor. The shared data structure may be an array (e.g., bitmap), a linked list, other data structure, or a combination thereof. The shared data structure may include an element (e.g., bit, node) for each of the memory pages and the element may indicate whether the memory page is released, un-released, or other state. In one example, the shared data structure may be stored in memory page space of the virtual machine. For example, each virtual machine may include a shared data structure in its respective guest memory 114A-C, which may be accessible to hypervisor 120. In another example, the shared data structure may be stored in hypervisor memory 126 and be accessible to one or more of the virtual machines. In the latter example, there may be a separate shared data structure within hypervisor memory 126 that corresponds to each of the virtual machine 110A-C or there may be a single shared data structure accessible to the group of virtual machines 110A-C.

Hypervisor 120 may also be known as a virtual machine monitor (VMM) and may provide virtual machines 110A-C with access to one or more features of hardware device. Hypervisor 120 may manage system resources, including access to hardware devices 130. In the example shown, hypervisor 120 may run directly on the hardware of computer system 100 (e.g., bare metal hypervisor). In another example, hypervisor 120 may run on or within a host operating system (not shown). Hypervisor 120 may include a page hinting component 122, a page reallocation component 124, and hypervisor memory 126.

Page hinting component 122 may process memory page hints received from the virtual machines in the form of indications 119A-C. The memory page hints may indicate which of the hypervisor memory pages associated with a virtual machine are in use or not in use by the virtual machine. For example, a hypervisor may allocate a portion of hypervisor memory 126 for use by a virtual machine and the guest operating system 112A may manage the allocated portion as shown by guest memory pages 116. Guest operating system 112A may be configured to optimize the use of the memory page by allocating portions of the memory pages to guest operating system processes and using the remaining portions as file system cache. As guest operating system 112A executes, it may release one or more guest memory pages (e.g., released guest memory pages 118) and may transmit indication 119A to hypervisor 120 when the released guest memory pages fill up an entire hypervisor memory page or multiple entire hypervisor memory pages.

Page reallocation component 124 may interact with page hinting component 122 to identify portions of hypervisor memory 126 that can be reclaimed and used to fulfill requests for additional memory pages. Page reallocation component 124 may analyze data of page hinting component 122 to identify portions of memory that have been allocated to a guest virtual machine but are not in use by the guest virtual machine. This may enable hypervisor 120 to reallocate the hypervisor memory pages without copying the content of the hypervisor memory page to and from a backing store (e.g., paging in/out).

Hardware devices 130 may provide hardware functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks discussed above in regards to components 122 and 124. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit (CPU).

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
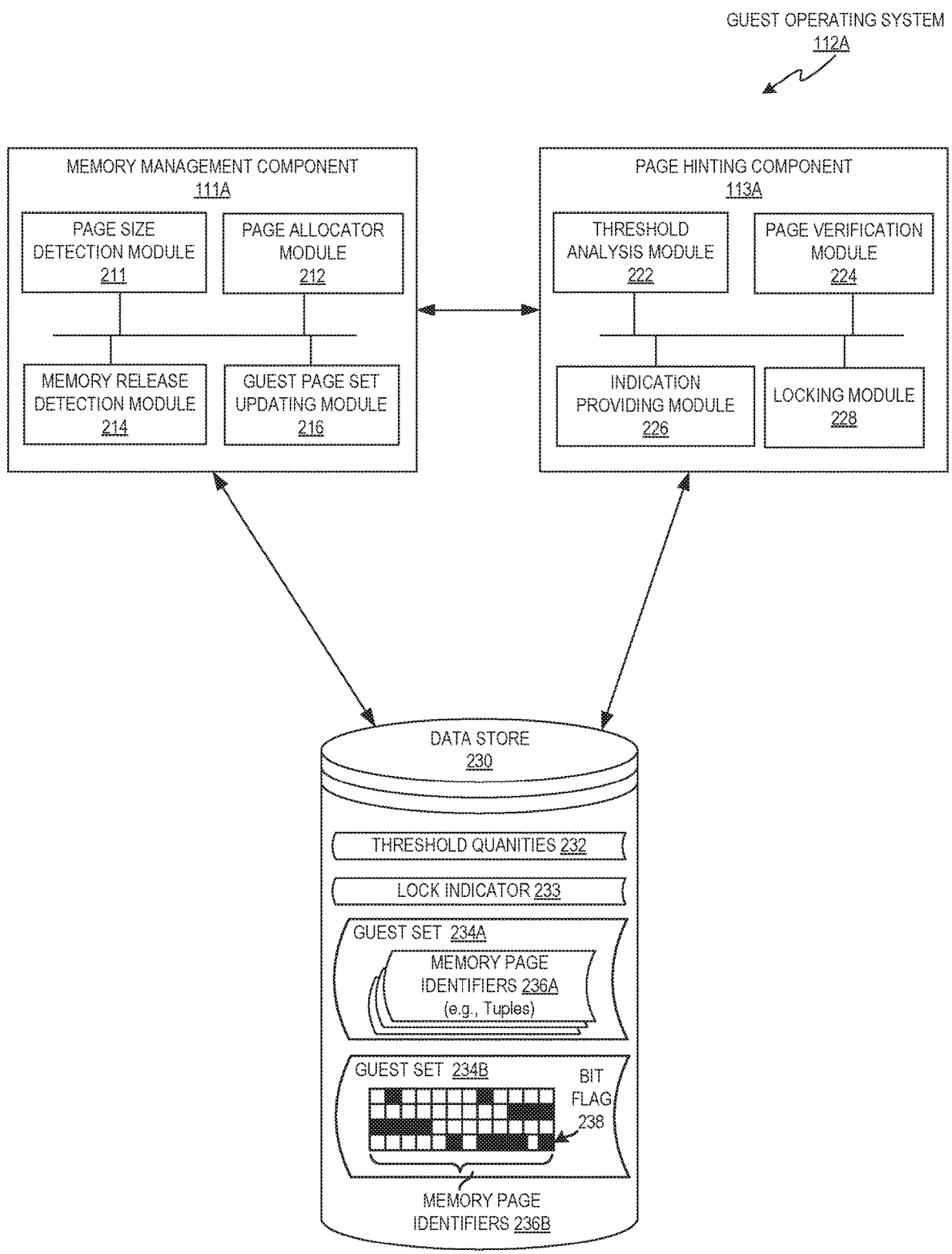
FIG. 2 depicts a block diagram of an example guest operating system that implements memory page hinting that takes into account multiple different page sizes, in accordance with one or more aspects of the present disclosure.

FIG. 2 is a block diagram illustrating example components and modules of guest operating system 112A, in accordance with one or more aspects of the present disclosure. Guest operating system 112A may be the same or similar to guest operating systems 112A-C of FIG. 1 and may include a memory management component 111A, a page hinting component 113A, and a data store 230. Memory management component 111A may include a page size detection module 211, a page allocator module 212, a memory release detection module 214, and a guest page set updating module 216. Page hinting component 113A may include a threshold analysis module 222, a page verification module 224, an indication providing module 226, and a locking module 228. More or less components may be included without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

Page size detection module 211 may enable guest operating system 112A to determine one or more memory page sizes of the guest operating system and one or more memory page sizes of the hypervisor. The memory page sizes of the guest operating system and the hypervisor may be the same, different, or a combination of both. The memory page sizes may be the same and different when a portion of the guest memory uses a page size that is the same as the underlying hypervisor memory and another portion of the guest memory uses page size that is different from the underlying hypervisor memory. Page size detection module 211 may determine based on one or more comparisons when the page size of guest memory is different from the portion of the hypervisor memory that it is allocated from. The page sizes identified by page size detection module 211 may be used by one or more of the modules discussed below to identify a corresponding hypervisor memory page and determine when to provide an indication and to the hypervisor.

Page allocator module 212 may enable guest operating system 112A to allocate portions of memory for use by guest operating system 112A and may release the portions for reuse when the memory is no longer needed by the guest operating system 112A. Page allocator module 212 may allocate memory using guest memory pages, which may be contiguous or non-contiguous blocks of virtual memory (e.g., a 4K-byte block of memory). The memory pages allocated by page allocator module 212 may have been derived from portions of memory designated for use by the guest operating system 112A by the underlying hypervisor. Releasing memory pages may be the same or similar to the guest operating system freeing memory pages or deallocating memory pages, which may involve dereferencing a memory page and enabling the memory page to be subsequently reused by guest operating system 112A.

Memory release detection module 214 may be integrated with page allocator module 212 and may detect memory pages that have been released by memory management component 111A of guest operating system 112A. In one example, detecting the released memory pages may involve receiving or listening for a particular event or signal associated with the release of a memory page. In another example, detecting the released memory pages may involve accessing or monitoring a data structure that includes memory status information. When memory release detection module 214 detects a released memory page, the memory release detection module 214 may indicate the change to guest page set updating module 216.

Guest page set updating module 216 may generate and update a set of memory pages that represents the guest memory pages have been released. The set of guest memory pages may be stored by the guest operating system in data store 230 and may be referred to as a guest set. The guest set may be accessed and modified by the guest operating system and may or may not be accessed (e.g., interpreted or comprehended) by the hypervisor. The guest set may be stored as a data structure that is capable of representing a plurality of guest memory pages and may be the same or similar to guest set 234A, guest set 234B, other set structure, or a combination thereof. Guest sets 234A and 234B may both include data that enables the guest operating system to track which memory pages or ranges of memory pages have been released.

Guest set 234A may be an example set that includes one or more memory page identifiers 236A. Each of the memory page identifiers 236A may be an element of the set that uniquely identify a memory page or a range of memory pages that are in a released state (e.g., allocated and not in use), in a non-released state (e.g., allocated and in use), other state, or a combination thereof. In one example, guest set 234A may include the memory pages that have been released without including memory pages that are in use. In another example, guest set 234A may include memory pages that are released (e.g., unused state) and memory pages that are in a used state along with additional data that indicates the corresponding state of each respective memory page.

Memory page identifiers 236A may include offset data (numeric or non-numeric values), address data (virtual, logical, or physical addresses), length data, link data (e.g., a pointer or link), other data, or a combination thereof. In one example, each of the memory page identifiers 236 may include a tuple that is stored as a variable and may have a 32 byte size, 64 byte size, or other size. The tuple may represent one or more memory pages or ranges of memory pages using a combination of values. The combination of values may include multiple separate address values, a single address value and a length value, other values, or a combination thereof. The address values may indicate the start, end, middle, other location, or a combination thereof of a particular guest memory page. The length value may indicate a contiguous length of memory space represented by the tuple. The length may be less than, equal to, or greater than a guest memory page (e.g., page size 115A), a hypervisor memory page (e.g., page size 115B), multiple guest or hypervisor memory pages, other size, or a combination thereof.

Guest set 234B is another example set and includes memory page identifiers 236B that represent each guest memory pages of a virtual machine and not just the memory pages that are in use or are not in use. Each of the memory page identifiers 236B may correspond to an element of a data structure and may represent a state of a particular memory page. The states may include a released state (e.g., not in use), a non-released state (e.g., in use), other state, or a combination thereof. The data structure may be an n-dimensional array, linked list, other data structure, or a combination thereof. In one example, guest set 234B may be an array of binary elements and the array may be the same or similar to a bitmap. Each of the memory page identifiers 236B may correspond to one of the binary elements (e.g., bit, flag, marker) and may indicate whether the corresponding guest memory page is in a first state (e.g., released) or in a second state (e.g., unreleased). In another example, guest set 234 may be a linked list of elements (e.g., nodes) representing respective guest memory pages. In either example, the beginning of the array (e.g., first element) may correspond to a first guest memory page in a continuous or non-contiguous sequence of guest memory pages and the location (e.g., position) of an element relative to the first element of the data structure may indicate which memory page is represented by the state of the element.

Guest page set updating module 216 may update a guest set using a technique that corresponds to the data structure storing the guest set. When guest set 234B is being used, guest page set updating module 216 may locate a particular element (e.g. memory page identifier 236B) that corresponds to the newly released memory page. As discussed above, guest set 234B may include an element for every memory page of guest memory independent of whether it is released or is still in use. After locating the corresponding element, guest page set updating module 216 may update the state of the element to reflect that the memory page is released. This may involve toggling a bit value of an element from false (e.g., 0) to true (e.g., 1) (or vice versa) as shown by bit flag 238. When guest set 234A is being used, guest page set updating module 216 may add a newly released memory page to the set by either adding a new element, adjusting an existing element, or a combination thereof. Adding a new element (e.g., memory page identifier 236A) may involve creating a new element and adding it to guest set 234A (e.g., appending a new node to a linked list). guest page set updating module 216 may adjust an existing element by modifying an element to add a range or modifying an element to update an existing range to represent an additional memory page. The range may be represented by multiple addresses (e.g., start and end address of a tuple) or by an address and a length (e.g., start address and length value of a tuple).

Guest page set updating module 216 may determine whether to add, modify, or merge elements by analyzing the location of the newly released memory page relative to one or more memory pages already in the set. Guest page set updating module 216 may compare the multiple locations and add a new element in response to determining the newly released memory page is not adjacent to any memory page within the set. guest page set updating module 216 may modify an existing element in response to determining the newly released memory page is adjacent to at least one memory page within the set the guest page set updating module 216. A memory page may be adjacent to another memory page when there are no other memory pages between them. guest page set updating module 216 may merge multiple elements of guest set 234A into a single element when module 216 determines that the multiple elements corresponds to memory pages that are adjacent to one another. The single element may include the multiple adjacent memory pages as a contiguous range of memory pages and may be a newly created element or may be one of the existing elements that has had its range expanded to represent the multiple adjacent memory pages. The merging may occur before, during, or after adding the multiple adjacent memory pages to guest set 234A and may be the same or similar to consolidating, combining, concatenating, joining, or other action.

Page hinting component 113A may access data generated or detected by memory management component 111A and propagate some or all of the information to the hypervisor. Page hinting component 113A may analyze a guest set of released memory pages (e.g., guest set 234A or 234B) and determine when and how to provide an indication to the hypervisor. In one example, page hinting component 113A may avoid providing an indication to the hypervisor each time a guest memory page is released and may wait until the set of released guest pages fill up at least one entire hypervisor memory page before providing the indication to the hypervisor. This may be advantageous because it may reduce the communication overhead (e.g., I/O) that occurs between the guest operating system and hypervisor. In the example, shown in FIG. 2, page hinting component 113A may include a threshold analysis module 222, a page verification module 224, an indication providing module 226, and a locking module 228.

Threshold analysis module 222 may analyze the guest set to determine whether the set of memory pages satisfies one or more threshold quantities 232. One or more of the threshold quantities 232 may be analyzed in view of the size of the set and whether the set of guest pages completely fills one or more hypervisor memory page. Threshold quantities 232 may be based on a particular quantity of pages (e.g., guest pages or hypervisor pages) or a quantity of space occupied by the pages (e.g., buffer space limit). Threshold quantities 232 may have any type of values such as integers, percentages, ratios, other values, or a combination thereof. The values may be relative to the size or limit of the memory, heap, page, set, buffer, other structure, or a combination thereof.

Threshold quantities 232 may include a first predetermined threshold quantity and a second predetermined threshold quantity. The first predetermined threshold quantity of threshold quantities 232 may indicate a minimum size (e.g., quantity of hypervisor memory pages) that the set occupies before providing an indication to the hypervisor. The second predetermined threshold quantity will be discussed in more detail below and may relate to an updated quantity of memory pages (e.g., set of verified pages) and may indicate when an indication should be delayed. Once the quantity of memory pages satisfies the first predetermined threshold quantity, the guest operating system 112A may verify the set using page verification module 224.

Page verification module 224 may analyze the guest memory pages to verify that the memory pages remain unused. As discussed above, the memory pages may be added to the set when they are released by the guest operating system but one or more of the memory pages within the set may be subsequently reused without being removed from the set. In one example, page verification module 224 may analyze memory pages by checking a flag associated with the memory page to ensure that the memory pages are not in use. In another example, page verification module 224 may query functions of the guest operating system, hypervisor, host operating system, hardware device, other module, or a combination thereof to determine whether the memory page is in use. When page verification module 224 determines a memory page is in use it may signal, guest page set updating module 216 to remove the memory page from the set. The memory pages that remain in the set may then be analyzed and processed by indication providing module 226.

Indication providing module 226 may notify the hypervisor of the memory pages that have been released by guest operating system 112A. In one example, indication providing module 226 may indicate one or more hypervisor memory pages that are no longer in use by the guest operating system. In another example, indication providing module 226 may indicate one or more guest memory pages that are no longer in use by the guest operating system. Indication providing module 226 may combine (e.g., batch) the identifiers for each of the released memory pages (e.g., guest and/or hypervisor memory pages) in a message and may transmit the message to the hypervisor. In one example, transmitting the message to the hypervisor may involve making a call to a programming interface of the hypervisor. The call may be a hypercall, a system call, other type of call, or a combination thereof.

Locking module 228 may provide a locking mechanism to inhibit the page allocator module 212 from allocating memory pages while page hinting component 113A is preparing to provide an indication (e.g., notification) to the hypervisor. The ability to inhibit (e.g., lock, stop, pause, restrict, prohibit) the page allocator module 212 may be useful because it may reduce the possibility that a hypervisor notification can be undermined during the processing phase and indicate that a memory page is released when the memory page is actually in use. In one example, locking module 228 may acquire a lock on the page allocator in response to threshold analysis module 222 determining the set of memory pages has satisfied a threshold quantity. The lock may be held while page verification module 224 and indication providing module 226 process the set of guest memory pages. The lock may be released or withdrawn after the indication providing module has transmitted the message or in response to receiving a response from the hypervisor, indicating the message was received and/or processed by the hypervisor. Acquiring the lock and releasing the lock may involve updating a lock indicator 233.

Lock indicator 233 may be any locking data structure that is accessible to guest operating system 112A and is capable of indicating a lock has been acquired. The locking data structure may include a bit or sequence of bits and may represent two or more states. Lock indicator 233 may include numeric or non-numeric values for indicting or representing the two states. In one example, lock indicator 233 may be a bit sequence that includes a counter (e.g., integer counter) that can be accessed by one or more virtual processors managed by guest operating system 112A. The counter may be a processor counter (e.g., virtual CPU counter), a global counter (e.g., guest OS counter), other counter, or a combination thereof. The processor counter may correspond to a particular virtual processor managed by the guest operating system whereas the global counter may correspond to some or all of the virtual processors managed by the guest operating system.

Lock indicator 233 may represent multiple different states that may correspond to the current state of the lock and may also indicate one or more state transitions that may have occurred since the lock was acquired. As discussed above, lock indicator 233 may include a counter and the counter may be updated (e.g., incremented or decremented) by one or more virtual processors to acquire or release a lock on the page allocator module 212. In one example, the counter may be continuously updated (e.g., incremented) to different values and a category of the value, as opposed to the specific value, may determine the state. The category of values may be based on whether the value evaluates to an even number, odd number, prime number, or whether it is or is not divisible my a particular number N, wherein N is any real number (e.g., 3, 4, 5, 6, . . . N).

In one example, locking module 228 may increment lock indicator 233 to an even number to indicate a lock has been acquired and subsequently increment the lock indicator again to an odd number to indicate the lock has been released (e.g., unlocked). In another example, locking module 228 may increment lock indicator 233 to an even number to indicate a lock has been acquired and subsequently decrement the lock indicator to an odd number to indicate the lock has been released (e.g., unlocked). The former example, which involves continually updating the lock indicator 233 in the same direction (e.g., incrementing), may be advantageous because it may enable the locking module to detect state transitions and therefore a third state. The third state may indicate that the lock indicator has changed since it was last updated, which may indicate another virtual processor has locked the page allocator and may indicate a race condition has occurred or may be occurring.

Figure 3:
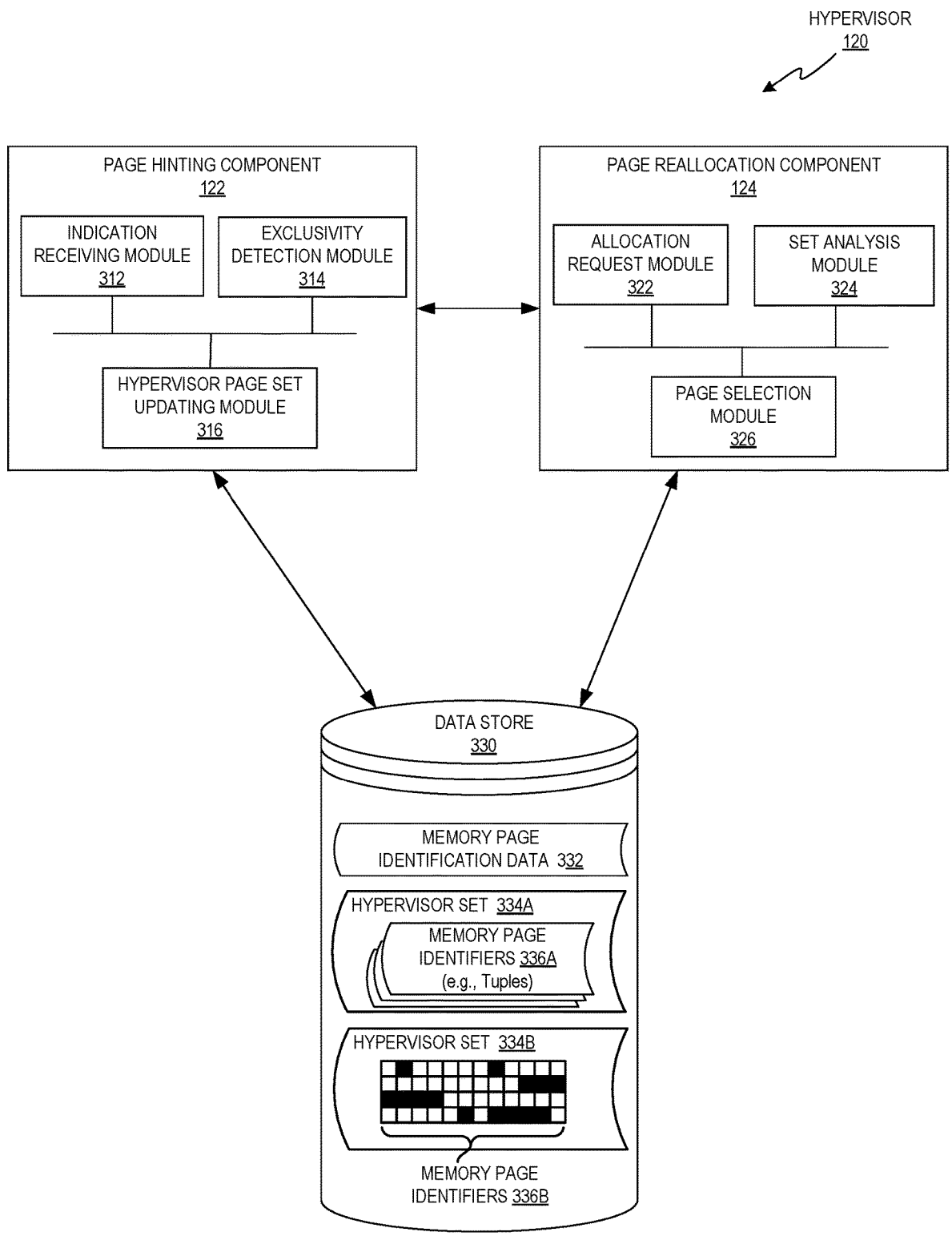
FIG. 3 depicts a block diagram of an example hypervisor that implements memory page hinting that takes into account multiple different page sizes, in accordance with one or more aspects of the present disclosure.

FIG. 3 is a block diagram illustrating example components and modules of hypervisor 120, in accordance with one or more aspects of the present disclosure. Hypervisor 120 may be the same or similar to the hypervisor 120 of FIG. 1 and may include a page hinting component 122, a page reallocation component 124, and a data store 330. More or less components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

Page hinting component 122 may process memory page hints received from virtual machines in the form of one or more indications. Page hinting component 122 may process the indications to identify a set of memory pages that have been assigned to a virtual machine but are not being used by the virtual machine. In the example shown in FIG. 1, page hinting component 122 may include an indication receiving module 312, an exclusivity detection module 314, and a guest page set updating module 316.

Indication receiving module 312 may be a portion of hypervisor that receives indications from the virtual machine. The indications may include memory page identification data 332 for identifying one or more hypervisor memory pages or ranges of hypervisor memory pages that contain (e.g., exclusively contain) content released by the guest operating system without content that is in use by the guest operating system. Memory page identification data 332 may include an offset value (numeric or non-numeric value), an address (virtual, logical, or physical address), a pointer, a link, other data, or a combination thereof. In one example, the identification data may be a memory page identifier that uniquely identifies a hypervisor memory page. The identification data may be data (e.g., offset value) that may be used by hypervisor 120 to determine a hypervisor memory page identifier of a memory page that includes content released by a respective guest operating system. In another example, the identification data may include a reference to a data structure that indicates the one or more hypervisor memory pages that are released (e.g., not in use), non-released (e.g., in use), or a combination thereof. The data structure may be an array (e.g., bitmap), a linked list, other data structure, or a combination thereof.

Exclusivity detection module 314 may analyze the memory pages that the virtual machine indicated were released and determine whether the memory pages are in use by any other computing entity. The other computing entity may be another virtual machine, the hypervisor, a host operating system, a hardware device, any executable code (e.g., process, thread, or computing stream), or a combination thereof. A particular hypervisor memory page may be assigned to one or more computing entities. When a memory page is assigned to multiple computing entities, the computing entities may share the memory page and neither may have exclusive use of the memory page. Therefore, when one of the computing entities releases the memory page the hypervisor may not reuse the memory page because the memory page may still be in use by another computing entity. In contrast, if the memory page is assigned to a single computing entity and is in not in use by another computing entity the memory page is referred to as being exclusively used by the single computing entity. Therefore, when the single computing entity (e.g., virtual machine) releases the memory page it may be reallocated by the hypervisor for use by another computing entity.

Exclusivity detection module 314 may analyze the released memory page to verify that the released memory page is exclusively assigned to a single virtual machine. Verifying that a memory page is exclusively assigned to a virtual machine may involve determining whether any other virtual machine is using (e.g., modifying, accessing, or has been assigned) the memory page. For example, verifying that a memory page is exclusively assigned to the virtual machine may involve determining whether another virtual machine has access to or has been assigned the same memory page. In one example, the memory pages may be memory pages and exclusivity detection module 314 may analyze a memory page data structure that identifies which memory pages are assigned to which virtual machines to determine whether a particular memory page is being shared between virtual machines or is being exclusively used by a single virtual machine.

Hypervisor page set updating module 316 may update a set of memory pages based on data of indication receiving module 312 and exclusivity detection module 314. Hypervisor page set updating module 316 may be similar to guest page set updating module 216 but may be executed by the hypervisor and may store the information in a hypervisor set (e.g., 334A or 334B) as opposed to a guest set (e.g., 234A or 234B). The hypervisor set may be updated by the hypervisor to reflect the memory pages that are allocated to a virtual machine but remain unused by the virtual machine. The set may be accessed and modified by the hypervisor and may or may not be accessible by a guest operating system. Updating the set may involve the same procedure discussed above in regards to guest page set updating module 216. For example, updating the set may involve adding a memory page to the set or removing memory pages from the set depending on whether the memory pages are available to be reallocated by the hypervisor. The memory pages may be particular guest memory pages, hypervisor memory pages, other memory pages, or a combination thereof. In one example, hypervisor page set updating module 316 may add a memory page to the set of memory pages in response to receiving an indication that the memory page includes content released by a guest operating system and is exclusively accessed by a single virtual machine. In another example, hypervisor page set updating module 316 may add a released memory page to the set of memory pages in response to determining that the memory page is shared by multiple virtual machines and was released by each of the respective virtual machines.

The set of memory pages may be represented by a data structure such as hypervisor set 334A or hypervisor set 334B. Hypervisor sets 334A and 334B may be the same or similar to respective guest sets 234A and 234B and may include data that enables the hypervisor to track which memory pages or ranges of memory pages have been released by the guest operating system. In one example, hypervisor sets 334A and 334B may identify hypervisor memory pages that include the content of multiple guest memory pages that have been released by the guest operating system.

Hypervisor set 334A may be an example set that includes one or more memory page identifiers 336A. Each of the memory page identifiers 336A may be an element of the set that uniquely identify a memory page or a range of memory pages that is allocated to a virtual machine but may or may not be in use by the virtual machine (e.g., released by guest operating system). In one example, hypervisor set 334A may include the memory pages that have been released by the guest operating system without including memory pages that are in use by the guest operating system. In another example, hypervisor set 334A may include memory pages that are not in use (e.g., released) and memory pages that are in use by the guest operating system.

Memory page identifiers 336A may include offset data (numeric or non-numeric values), address data (virtual, logical, or physical addresses), length data, link data (e.g., a pointer or link), other data, or a combination thereof. In one example, each of the memory page identifiers 336A may include a tuple that is stored as a variable and may have a 32 byte size, 64 byte size, or other size. The tuple may represent one or more memory pages or ranges of memory pages (e.g., hypervisor pages or guest pages) using a combination of values. The combination of values may include multiple separate address values, a single address value and a length value, other values, or a combination thereof. The address values may indicate the start, end, middle, other location, or a combination thereof of a particular guest memory page. The length value may indicate a contiguous length of memory space represented by the tuple. The length may be less than, equal to, or greater than a guest memory page (e.g., page size 115A), a hypervisor memory page (e.g., page size 115B), multiple guest or hypervisor memory pages, other size, or a combination thereof.

Hypervisor set 334B is another example set and includes one or more memory page identifiers 336B. Memory page identifiers 336B may represent either hypervisor memory pages or guest memory pages that include content that is not in use by a virtual machine (e.g., released by guest operating system). Each of the memory page identifiers 336B may correspond to an element of a data structure and may represent a state of a particular memory page. The states may include a released state (e.g., not in use), a non-released state (e.g., in use), other state, or a combination thereof. The data structure may be an n-dimensional array, linked list, other data structure, or a combination thereof. In one example, hypervisor set 334B may be an array of binary elements and the array may function as a bitmap. Each memory page identifier 336B may correspond to one of the binary elements (e.g., bit, flag, marker) and may indicate whether the corresponding hypervisor or guest memory page is in a first state (e.g., released) or in a second state (e.g., unreleased). In another example, hypervisor set 334B may be a linked list of elements (e.g., nodes) the nodes representing respective hypervisor or guest memory pages. In either example, the beginning of the array (e.g., first element) may correspond to a first memory page in a continuous or non-contiguous sequence of memory pages and the location (e.g., position) of an element relative to the first element of the data structure may indicate which memory page is represented by the state of the element.

Page reallocation component 124 may interact with page hinting component 122 to identify portions of the hypervisor's memory that can be allocated (e.g., reallocated) to fulfill requests from virtual. Page reallocation component 124 may analyze data of page hinting component 122 to identify hypervisor memory pages that have been allocated to a virtual machine but are not in use by the virtual machine. For example, a memory page may be allocated to a virtual machine but may have been released by the guest operating system of the virtual machine and may remain in an allocated but unused state (e.g., released). Traditionally, reallocating a memory page may involve copying content of the memory page to a backing store and clearing the memory page before reallocating it to fulfill the request for a memory page. The technology disclosed herein may enable hypervisor 120 to reallocate memory pages in a more efficient manner because page reallocation component 124 may be able to detect when a memory page that is allocated to a virtual machine is not in use by the virtual machine. As a result, page reallocation component 124 may reallocate (e.g., reuse) the memory page without copying the content of the memory page to a backing store and subsequently retrieving the content from the backing store when the original virtual machine attempts to re-access the memory page. In the example shown in FIG. 3, page reallocation component 124 may include an allocation request module 322, a set analysis module 324, and a page selection module 326.

Allocation request module 322 may receive or access a request from a virtual machine to allocate memory page to the virtual machine. The virtual machine may initiate the request using a variety of different mechanisms. A first mechanism may involve a failed attempt to access a memory page that no longer resides at the designated location in the physical memory page device. This may occur when the memory page is a memory page and the memory page has been evicted. The attempt to access the memory page may generate a page fault, which may be addressed by an underlying memory management module. The page fault may function as the request to allocate memory page. A second mechanism may involve a virtual machine initiating the request using a hypercall. The virtual machine may be executing in a para-virtualized environment and be aware of and able to communicate with the hypervisor using hypercalls. A hypercall may be similar to a system call but may enable a thread executed by the virtual machine to communicate with the hypervisor as opposed to the guest operating system. In one example, the hypercall may be used to implement memory page ballooning.

Memory page ballooning may be a memory page reclamation technique that is used by a hypervisor or host operating system to enable a computer system to take memory from one or more virtual machines and share it with other virtual machines. Memory page ballooning may enable the total amount of memory page resources (e.g., memory pages) occupied by the guest virtual machines to exceed the amount of physical memory page resources (e.g., main memory) available on the computer system. When the computer system is low on physical memory page resources the memory page ballooning may allocate the memory page resources selectively among the virtual machines. The memory page balloon represents the memory page provided to other virtual machines and the process of a virtual machine relinquishing memory page may be referred to as inflating the balloon and the process of acquiring memory page may be referred to as deflating the balloon. Portions of memory page ballooning may be implemented within each of the virtual machines in the form of a driver (e.g., balloon driver) or memory page function (e.g., kernel memory page management module) of the guest operating system. Memory page ballooning may enable multiple virtual machines to share memory page resources amongst one another in a voluntary or involuntary manner. In one example, memory page ballooning may be the same or similar to a computer memory reclamation technique known as virtual memory ballooning. Virtual memory ballooning may be used by hypervisor 120 to enable the computer system (e.g., host machine) to retrieve unused memory from certain guest virtual machines.

The act of relinquishing memory page may be different than the act of releasing memory page, which is discussed above. Releasing memory page may involve a guest operating system freeing the memory page so that it is unused by the guest operating system even though the memory page remains allocated to the virtual memory executing the guest operating system. A guest operating system that releases memory page may not change the amount of memory page allocated to the virtual machine and may just change the use of the memory page allocated to the virtual machine. Therefore, a guest operating system that releases memory page may enable the total amount of memory page allocated to the virtual machine to remain constant (e.g., approximately the same). Relinquishing memory page may involve the guest operating system identifying a portion of memory page that can be given back to the hypervisor so that the total amount of memory page allocated to the virtual machine changes (e.g., does not remain constant) and either decreases (e.g., balloon inflates) or increases (balloon deflates).

Set analysis module 324 may enable hypervisor 120 to analyze the set of memory pages (e.g., set 334A or 334B) to identify one or more memory pages that can be reallocated to satisfy the request for additional memory page. Set analysis module 324 may gather data about multiple different aspects of each memory page, such as, the source of the memory page (e.g., associated virtual machine, original owner), the size of the memory page (e.g., standard page or huge page), the location of the memory page (e.g., proximity to other released memory pages), other information, or a combination thereof.

Page selection module 326 may access data gathered by set analysis module 324 and may select one or more memory pages that fulfill the request. The selection of a memory page may take into account the amount of memory pages that should be cleared, the locality of the memory pages (e.g., whether they are partially or completely contiguous), the size alignment (e.g., a single huge page is better than multiple standard pages), other aspects, or a combination thereof. Minimizing the memory page that needs to be paged in and out of backing store may be used to prioritize which memory pages are used to fulfill the virtual machine's request.

Figure 4:
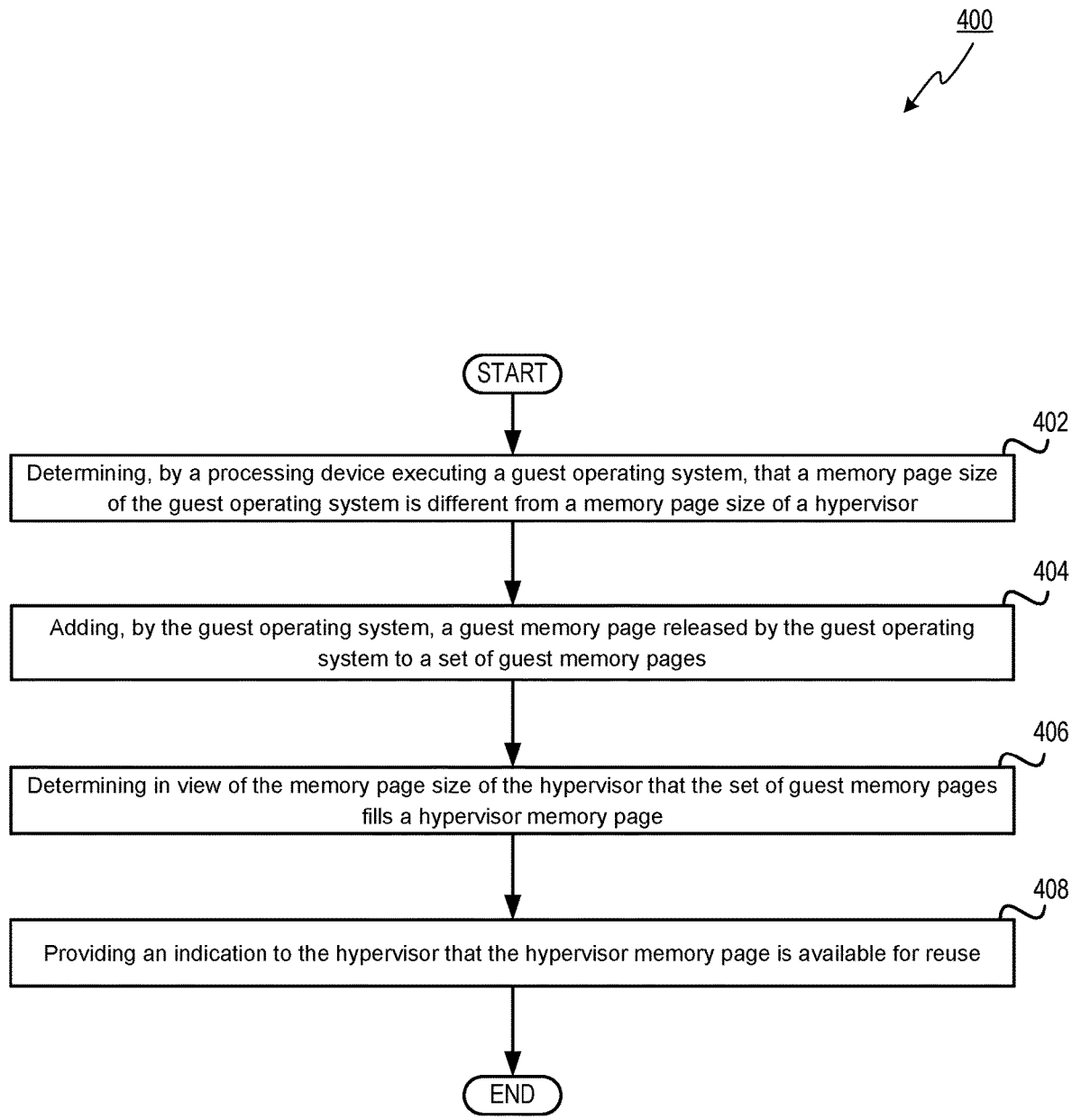
FIG. 4 depicts a flow diagram of an example method executed by a guest operating system to provide memory page hinting, in accordance with one or more aspects of the present disclosure.
Figure 5:
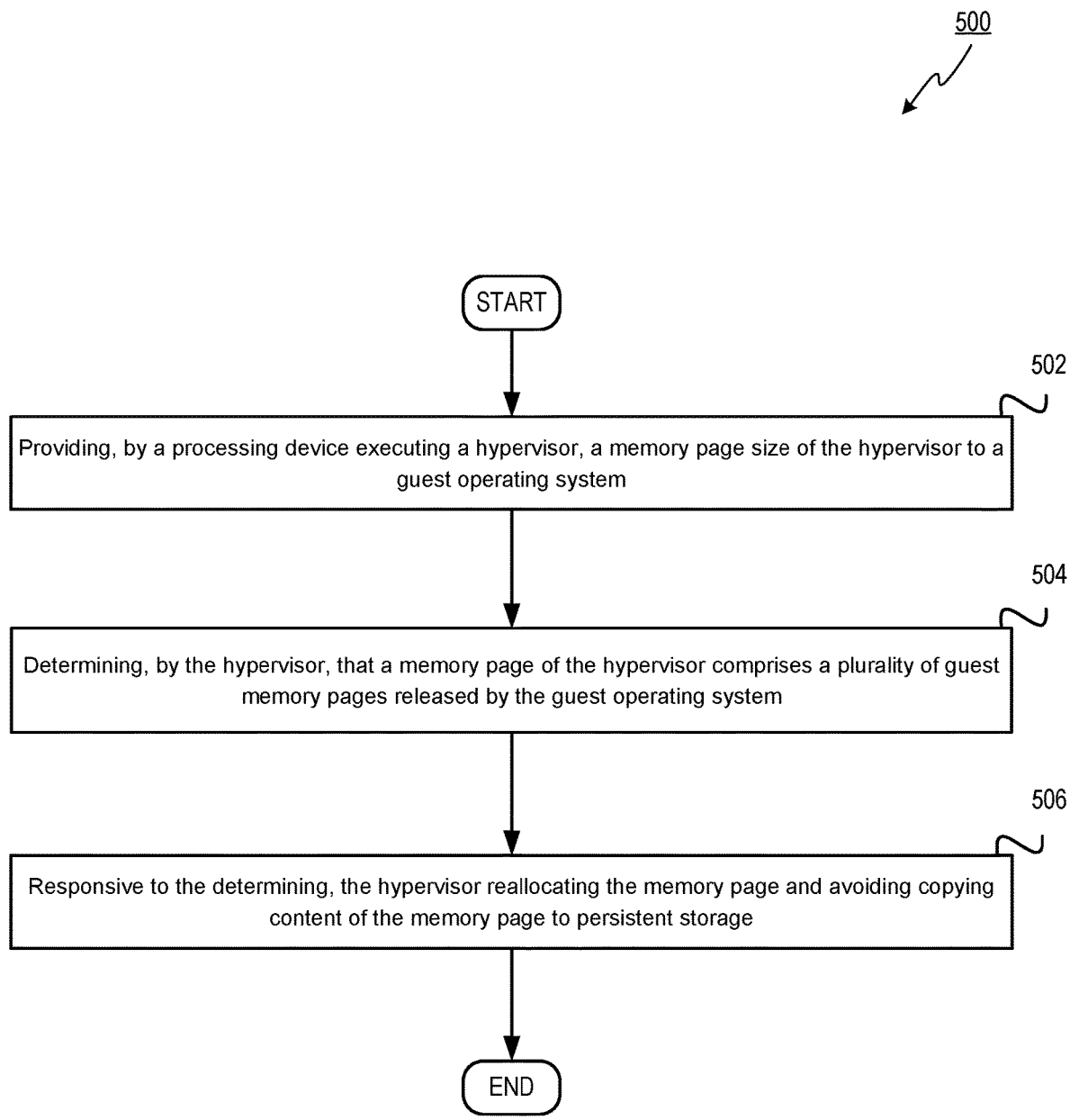
FIG. 5 depicts a flow diagram of an example method executed by a hypervisor to use memory page hints, in accordance with one or more aspects of the present disclosure.

FIGS. 4 and 5 depict flow diagrams for illustrative examples of methods 400 and 500 for memory page hinting, in accordance with one or more aspects of the present disclosure. Method 400 illustrates an example process flow from the perspective of the guest operating system and method 500 is an example process flow from the perspective of a hypervisor. Methods 400 and 500 may be performed by processing devices that may comprise hardware (e.g., circuitry, dedicated logic, programmable logic, microcode, etc.), executable code (such as is run on a general purpose computer system or a dedicated machine), or a combination of both. Methods 400 and 500 and each of their individual functions, routines, subroutines, or operations may be performed by one or more processors of the computer device executing the method. In certain implementations, methods 400 and 500 may each be performed by a single processing thread. Alternatively, methods 400 and 500 may be performed by two or more processing threads, each thread executing one or more individual functions, routines, subroutines, or operations of the method. In an illustrative example, the processing threads implementing methods 400 and 500 may be synchronized (e.g., using semaphores, critical sections, and/or other thread synchronization mechanisms). Alternatively, the processes implementing methods 400 and 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 400 and 500 may be performed by computer system 100 as shown in FIG. 1.

Referring to FIG. 4, method 400 may be performed by processing devices of a server device or a client device and may begin at block 402. At block 402, the processing device executing a guest operating system may determine that a memory page size of the guest operating system is different from a memory page size of a hypervisor that manages the guest operating system. The processing device may determine the memory page size of the hypervisor by transmitting a request (e.g., hypercall) to the hypervisor and receiving a message back from the hypervisor with data indicating the memory page size. The memory page size received from the hypervisor may include one or more page sizes that are supported by the hypervisor and each of the one or more page sizes may correspond to a different region of the hypervisors memory space. In one example, the memory page size of the hypervisor may be larger than the memory page size of the guest operating system and a single hypervisor memory page may include a plurality of guest memory pages. In another example, the memory page size of the hypervisor may be smaller than or equal to the memory pages size of the guest operating system and a single guest memory page may be stored within one or more hypervisor memory pages.

At block 404, the processing device executing the guest operating system may add a guest memory page released by the guest operating system to a set of guest memory pages. The set of guest memory pages released by the guest operating system may include one or more tuples and adding the guest memory page to the set may involve adding a tuple to the set or expanding a range of an existing tuple. In one example, the guest memory page added to the set may include multiple guest memory pages that have been released by the guest operating system and that remain allocated to a virtual machine executing the guest operating system.

At block 406, the processing device executing the guest operating system may determine in view of the memory page size of the hypervisor that the set of guest memory pages fills a hypervisor memory page. The determination may involve the guest operating system determining an address of the hypervisor memory page containing the guest memory page in view of the memory page size of the hypervisor. This may involve identifying a location (e.g., virtual, logical, or physical address) of one or more of the guest memory pages and comparing it to a location (e.g., virtual, logical, or physical address) of one or more hypervisor memory pages. The guest operating system may base the determination on a hypothesis that the first page of guest memory starts at the beginning of a hypervisor page and may or may not contact the hypervisor to confirm this hypothesis. The guest operating system may then generate a message comprising the location (e.g., address) of the hypervisor memory page as opposed to the location of the guest memory page. As a result, the indication may be aligned with the memory page size of the hypervisor as opposed to the memory page size of the guest operating system.

At block 408, the processing device executing the guest operating system may provide an indication to the hypervisor that the hypervisor memory page is available for reuse. Providing the indication may be in response to the set of guest memory pages released by the guest operating system filling a hypervisor memory page or filling a predetermined threshold number of hypervisor memory pages. Filling a hypervisor memory page may involve completely filling the entire hypervisor page without having a portion of the hypervisor page in use by any guest operating system. In one example, providing the indication to the hypervisor may involve the guest operating system initiating a hypercall that transmits a message comprising a memory page identifier. In another example, providing the indication to the hypervisor may involve the guest operating system updating a shared data structure that represents the set of guest memory pages released by the guest operating system, wherein the shared data structure is modifiable by the one or more guest operating system and is accessible to the hypervisor. In either example, providing the indication that the hypervisor memory page is available for reuse may enable the hypervisor to reuse the hypervisor memory page and avoid copying content of the hypervisor memory page to persistent storage. The hypervisor memory page may be stored on a primary storage device and the persistent storage may include swap space of a secondary storage device. Responsive to completing the operations described herein above with references to block 408, the method may terminate.

Referring to FIG. 5, method 500 may be performed by processing devices of a server device or a client device and may begin at block 502. At block 502, the processing device executing a hypervisor may provide a memory page size of the hypervisor to a guest operating system. The processing device may provide the memory page size by responding to a request received from the guest operating system. The request may be initiated by the guest operating system using a hypercall and the hypervisor may respond with a message that includes data indicating the memory page size. The memory page size of the hypervisor may include one or more page sizes that are supported by the hypervisor and each of the one or more page sizes may correspond to a different region of the hypervisors memory space. The memory page size of the hypervisor may be larger than the memory page size of the guest operating system and a single hypervisor memory page may include a plurality of guest memory pages. In one example, the memory page of the hypervisor is filled by guest memory pages released by a single guest operating system. In another example, the memory page of the hypervisor may be filled by guest memory pages released by multiple guest operating systems.

At block 504, the processing device executing the hypervisor may determine that a memory page of the hypervisor comprises a plurality of guest memory pages released by the guest operating system. The guest memory pages released by the guest operating system may remain allocated to a virtual machine executing the guest operating system. The determination may involve receiving, from the guest operating system, an indication comprising data to determine that one or more of the hypervisor's memory pages comprise content released by the guest operating system. The data may identify at least one hypervisor memory page that includes content released by the guest operating system without including content in use by the guest operating system. In one example, the indication may involve a hypercall initiated by the guest operating system after one of the guest memory pages has been released and comprises a memory page identifier. In another example, the indication may involve a reference to a shared data structure and be received before the guest memory pages have been released. The shared data structure may represent a set of memory pages that are allocated to the virtual machine and a portion of the set that is unused by the guest operating system.

At block 506, the processing device executing the hypervisor may reallocate the memory page and avoid copying content of the memory page to persistent storage. The reallocation may be done in response to analyzing a set of hypervisor memory pages that include content that was released by one or more guest operating systems. For example, the set may include hypervisor memory pages that are allocated to a virtual machine but may have been released by the guest operating system of the virtual machine and may remain in an allocated but unused state (e.g., released). Traditionally, reallocating a memory page may involve copying content of the memory page to a backing store and clearing the memory page before reallocating it to fulfill the request for a memory page. The technology disclosed herein may enable hypervisor 120 to reallocate memory pages in a more efficient manner because the processing device may be able to detect when a hypervisor memory page that is allocated to a virtual machine is not in use by the virtual machine. As a result, a hypervisor memory page may be reallocated (e.g., reused) without copying the content of the memory page to a backing store and subsequently retrieving the content from the backing store when the original virtual machine attempts to access the memory page again. Responsive to completing the operations described herein above with references to block 506, the method may terminate.

In an alternative example of method 500, the processing device executing the hypervisor may add a plurality of memory pages of the hypervisor to a set of allocated and unused memory pages. The set of allocated and unused memory pages may include one or more tuples and adding the plurality of memory pages to the set may alter the one or more tuples. In one example, adding memory pages to the set may involve expanding a range of a single tuple to represent the plurality of memory pages. In another example, adding the plurality of memory pages to the set may involve adding a plurality of tuples to the set and each of the tuples may correspond to one of the memory pages. The processing device may subsequently select the memory page added to the set of allocated and unused memory and reallocate it to the same or different virtual machine.

Figure 6:
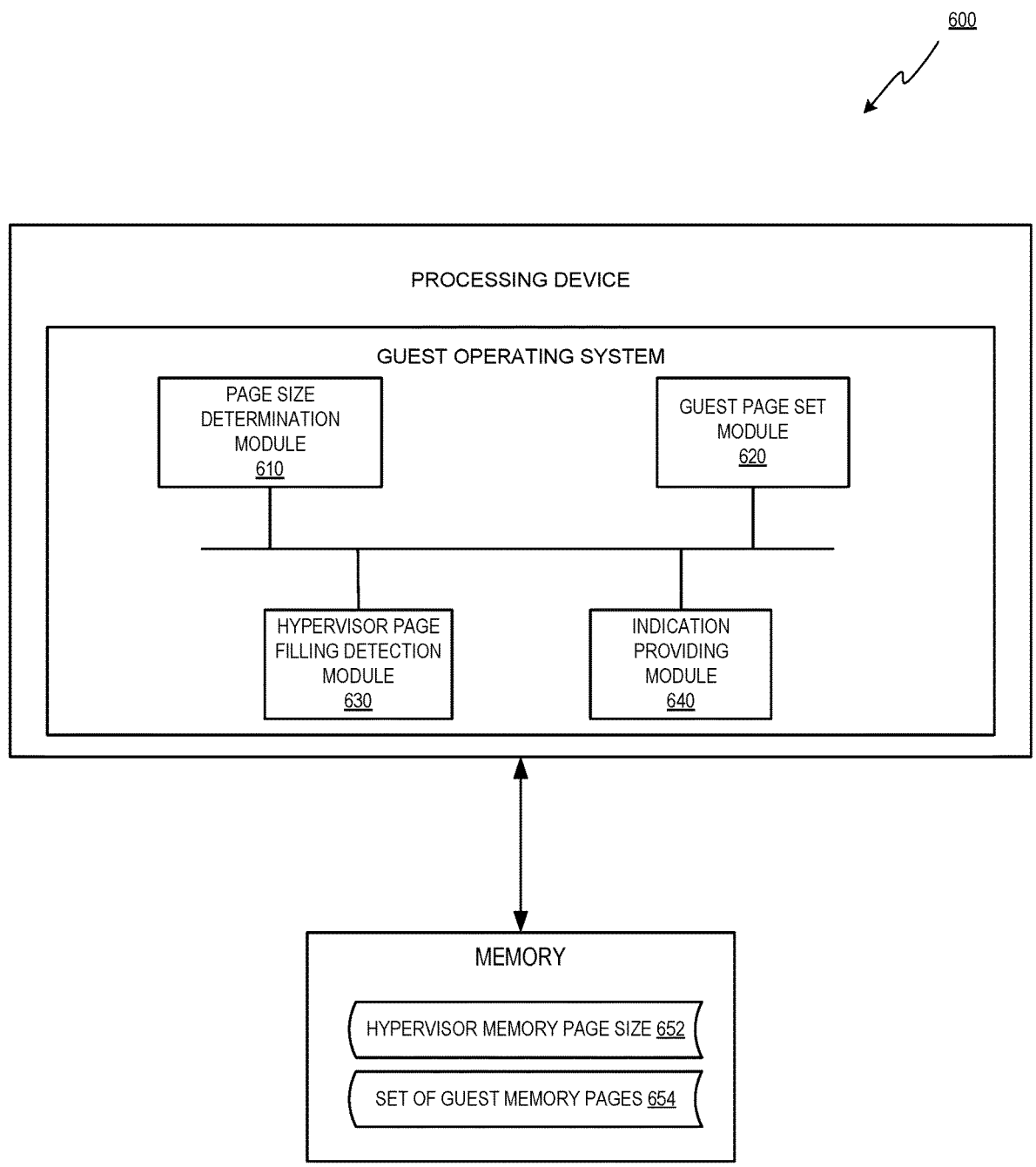
FIG. 6 depicts a block diagram of an example computer system in accordance with one or more aspects of the present disclosure.

FIG. 6 depicts a block diagram of a computer system 600 operating in accordance with one or more aspects of the present disclosure. Computer system 600 may be the same or similar to computer system 100 and may include one or more processing devices and one or more memory devices. In the example shown, computer system 600 may include a page size determination module 610, a guest page set module 620, a hypervisor page filling detection module 630, and an indication providing module 640.

Page size determination module 610 may enable the processing device executing a guest operating system to determine that a memory page size of the guest operating system is different from a hypervisor memory page size 652 of a hypervisor that manages the guest operating system. The processing device may determine the memory page size of the hypervisor by transmitting a request (e.g., hypercall) to the hypervisor and receiving a message back from the hypervisor with data indicating the hypervisor memory page size 652. The hypervisor memory page size 652 received from the hypervisor may include one or more page sizes that are supported by the hypervisor and each of the one or more page sizes may correspond to a different region of the hypervisors memory space. In one example, the hypervisor memory page size 652 may be larger than the memory page size of the guest operating system and a single hypervisor memory page may include a plurality of guest memory pages. In another example, hypervisor memory page size 652 may be smaller than or equal to the memory pages size of the guest operating system and a single guest memory page may be stored within one or more hypervisor memory pages.

Guest page set module 620 may enable the processing device executing the guest operating system to add a guest memory page released by the guest operating system to a set of guest memory pages 654. Set of guest memory pages 654 may include one or more tuples and adding the guest memory page to the set may involve adding a tuple to the set or expanding a range of an existing tuple. In one example, the guest memory page added to the set may include multiple guest memory pages that have been released by the guest operating system and that remain allocated to a virtual machine executing the guest operating system.

Hypervisor page filling detection module 630 may enable the processing device executing the guest operating system to determine in view of the hypervisor memory page size 652 of the hypervisor that the set of guest memory pages fills a hypervisor memory page. The determination may involve the guest operating system determining an address of the hypervisor memory page containing the guest memory page in view of the memory page size of the hypervisor. This may involve identifying a location (e.g., virtual, logical, or physical address) of one or more of the guest memory pages and comparing it to a location (e.g., virtual, logical, or physical address) of one or more hypervisor memory pages. The guest operating system may base the determination on a hypothesis that the first page of guest memory starts at the beginning of a hypervisor page and may or may not contact the hypervisor to confirm this hypothesis. The guest operating system may then generate a message comprising the location (e.g., address) of the hypervisor memory page as opposed to the location of the guest memory page. As a result, the indication may be aligned with the memory page size of the hypervisor as opposed to the memory page size of the guest operating system.

Indication providing module 640 may enable the processing device executing the guest operating system to provide an indication to the hypervisor that the hypervisor memory page is available for reuse. Providing the indication may be in response to the set of guest memory pages released by the guest operating system filling a hypervisor memory page or filling a predetermined threshold number of hypervisor memory pages. Filling a hypervisor memory page may involve completely filling the entire hypervisor page without having a portion of the hypervisor page in use by any guest operating system. In one example, providing the indication to the hypervisor may involve the guest operating system initiating a hypercall that transmits a message comprising a memory page identifier. In another example, providing the indication to the hypervisor may involve the guest operating system updating a shared data structure that represents the set of guest memory pages released by the guest operating system, wherein the shared data structure is modifiable by the one or more guest operating system and is accessible to the hypervisor. In either example, providing the indication that the hypervisor memory page is available for reuse may enable the hypervisor to reuse the hypervisor memory page and avoid copying content of the hypervisor memory page to persistent storage. The hypervisor memory page may be stored on a primary storage device and the persistent storage may include swap space of a secondary storage device.

Figure 7:
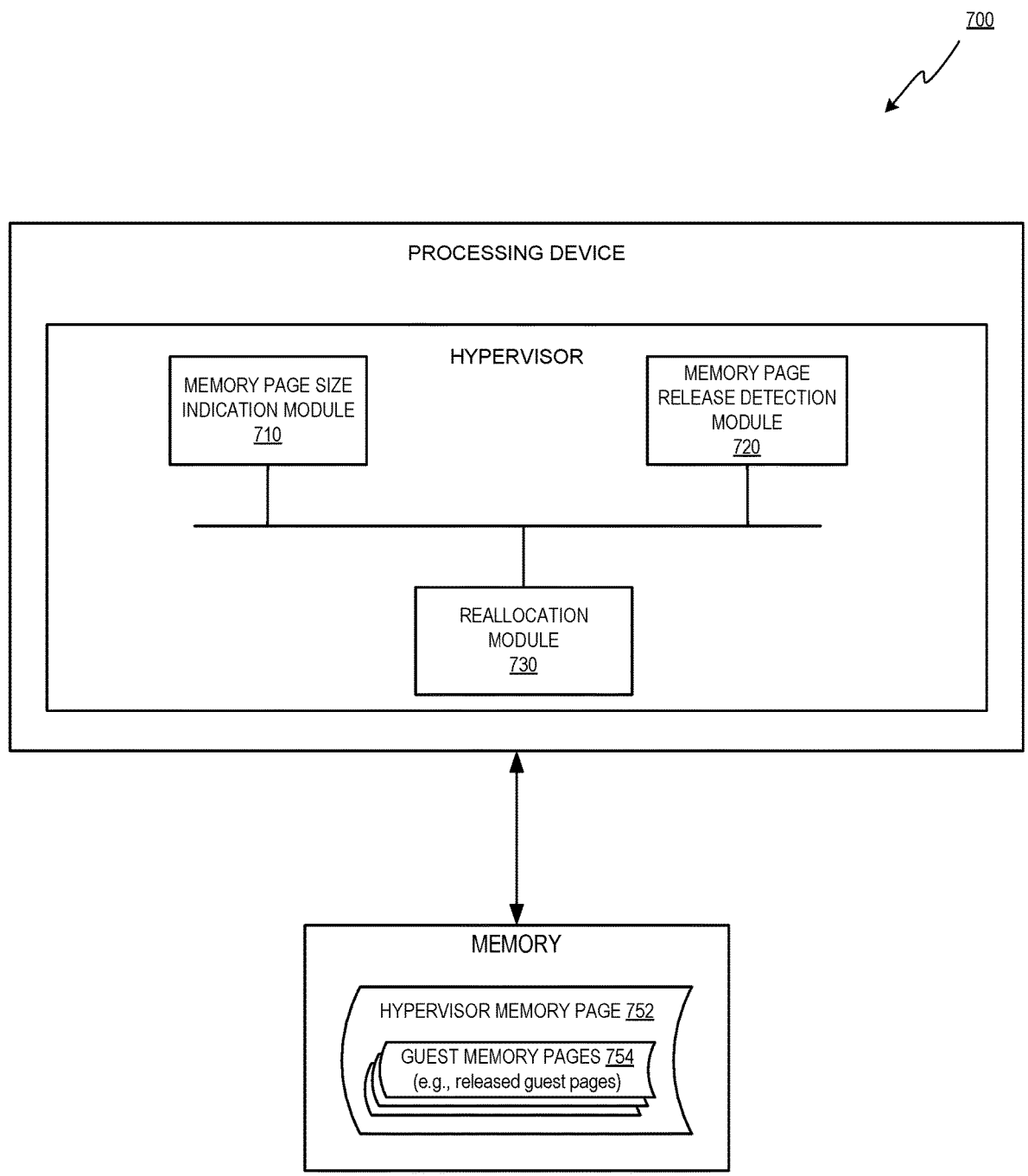
FIG. 7 depicts a block diagram of another example computer system in accordance with one or more aspects of the present disclosure.

FIG. 7 depicts a block diagram of a computer system 700 operating in accordance with one or more aspects of the present disclosure. Computer system 700 may be the same or similar to computer system 100 and may include one or more processing devices and one or more memory devices. In the example shown, computer system 700 may include a memory page size indication module 710, a memory page release detection module 720, and a reallocation module 730.

Memory page size indication module 710 may enable the processing device executing a hypervisor to provide a memory page size of the hypervisor to a guest operating system. The processing device may provide the memory page size by responding to a request received from the guest operating system. The request may be initiated by the guest operating system using a hypercall and the hypervisor may respond with a message that includes data indicating the memory page size. The memory page size of the hypervisor may include one or more page sizes that are supported by the hypervisor and each of the one or more page sizes may correspond to a different region of the hypervisors memory space. The memory page size of the hypervisor may be larger than the memory page size of the guest operating system and a single hypervisor memory page may include a plurality of guest memory pages. In one example, the memory page of the hypervisor is filled by guest memory pages released by a single guest operating system. In another example, the memory page of the hypervisor may be filled by guest memory pages released by multiple guest operating systems.

Memory page release detection module 720 may enable the processing device executing the hypervisor to determine that a hypervisor memory page 752 of the hypervisor comprises a plurality of guest memory pages 754 released by the guest operating system. The guest memory pages 754 released by the guest operating system may remain allocated to a virtual machine executing the guest operating system. The determination may involve receiving, from the guest operating system, an indication comprising data to determine that one or more of the hypervisor's memory pages comprise content released by the guest operating system. The data may identify at least one hypervisor memory page that includes content released by the guest operating system without including content in use by the guest operating system. In one example, the indication may involve a hypercall initiated by the guest operating system after one of the guest memory pages has been released and comprises a memory page identifier. In another example, the indication may involve a reference to a shared data structure and be received before the guest memory pages have been released. The shared data structure may represent a set of memory pages that are allocated to the virtual machine and a portion of the set that is unused by the guest operating system.

Reallocation module 730 may enable the processing device executing the hypervisor to reallocate the memory page and avoid copying content of the memory page to persistent storage. The reallocation may be done in response to analyzing a set of hypervisor memory pages that include content that was released by one or more guest operating systems. For example, the set may include hypervisor memory pages that are allocated to a virtual machine but may have been released by the guest operating system of the virtual machine and may remain in an allocated but unused state (e.g., released). Traditionally, reallocating a memory page may involve copying content of the memory page to a backing store and clearing the memory page before reallocating it to fulfill the request for a memory page. The technology disclosed herein may enable hypervisor 120 to reallocate memory pages in a more efficient manner because the processing device may be able to detect when a hypervisor memory page that is allocated to a virtual machine is not in use by the virtual machine. As a result, a hypervisor memory page may be reallocated (e.g., reused) without copying the content of the memory page to a backing store and subsequently retrieving the content from the backing store when the original virtual machine attempts to access the memory page again.

Figure 8:
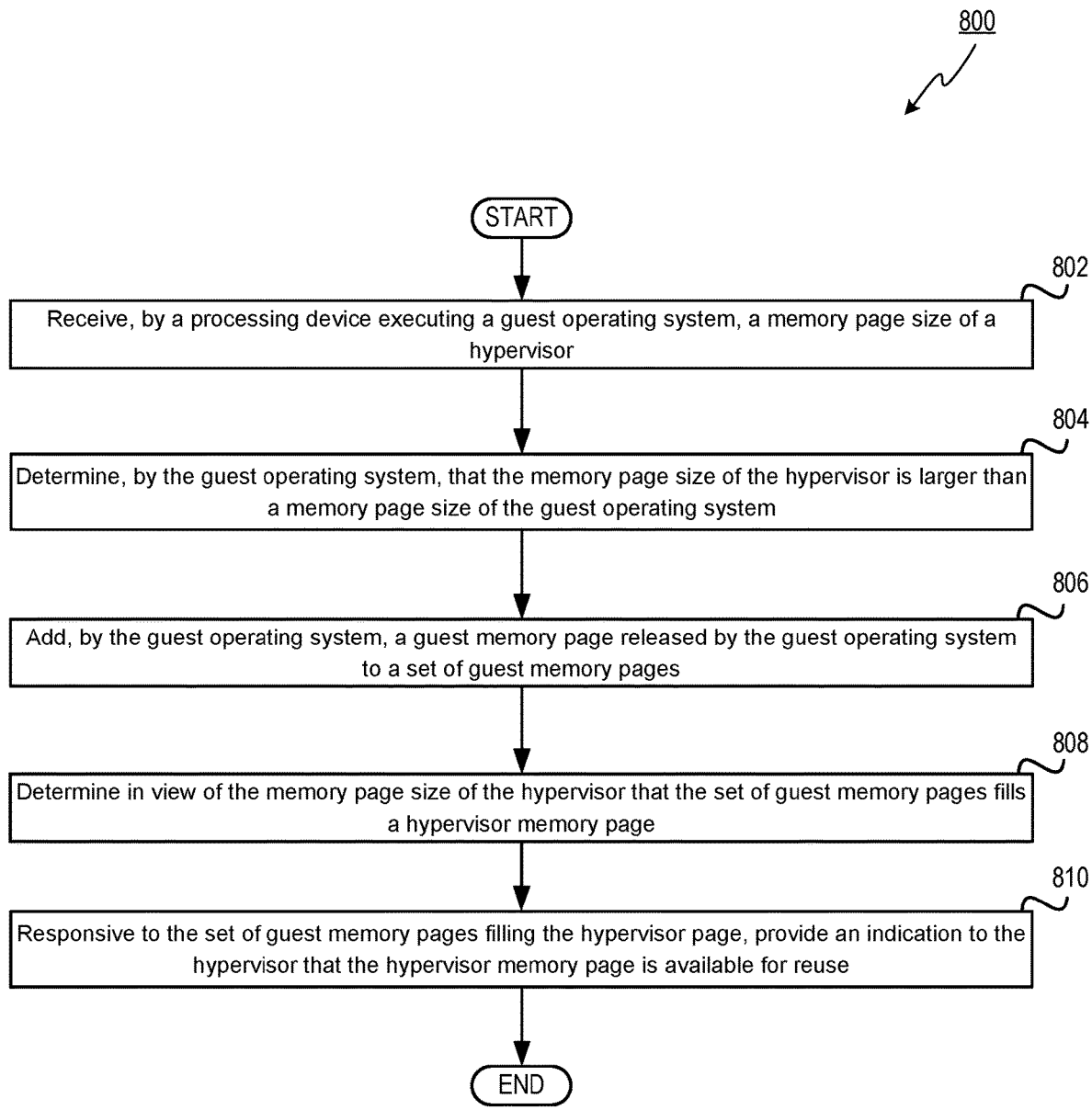
FIG. 8 depicts a flow diagram of another example method executed by a guest operating system to provide memory page hinting, in accordance with one or more aspects of the present disclosure.
Figure 9:
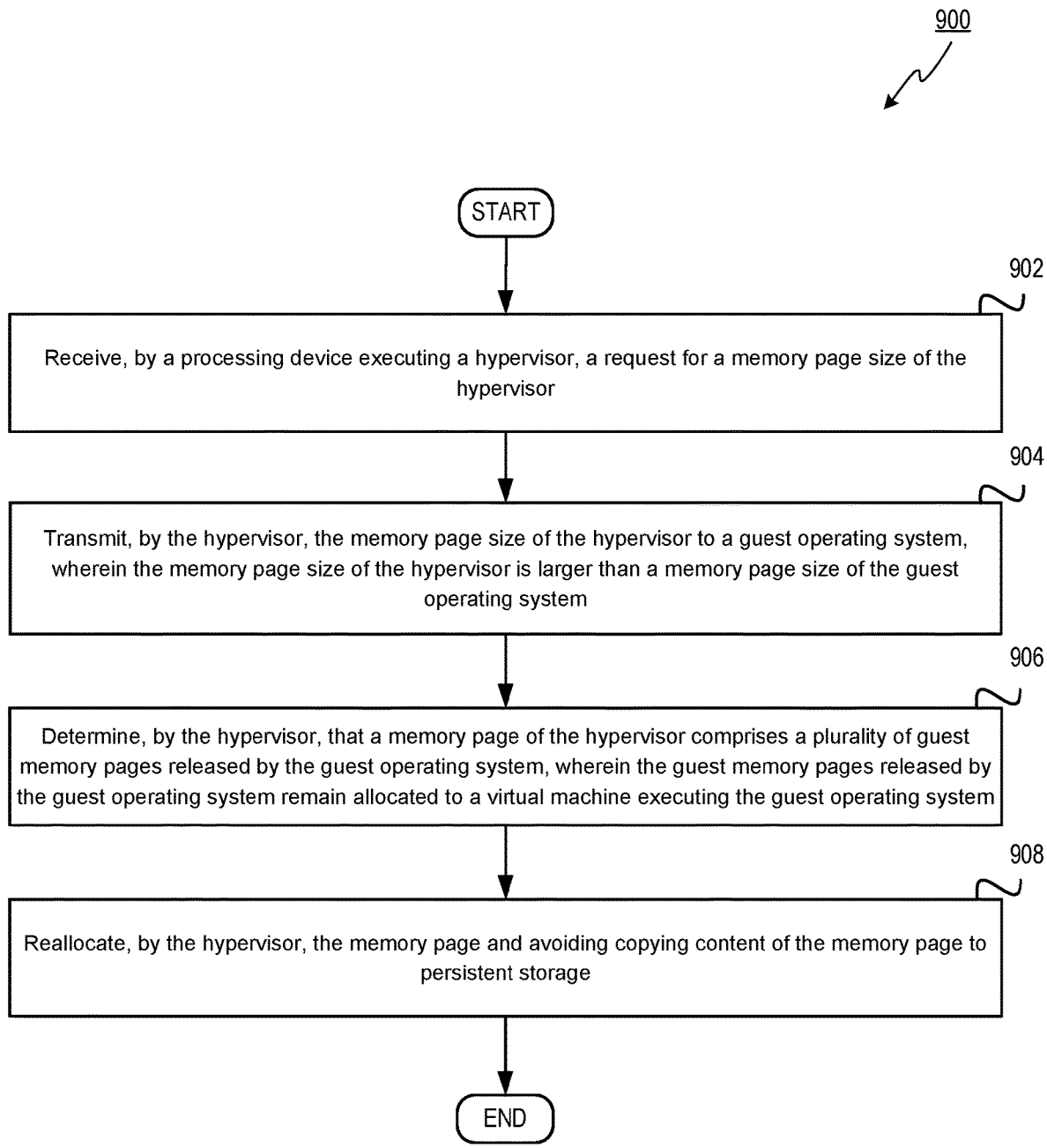
FIG. 9 depicts a flow diagram of another example method executed by a hypervisor to use memory page hinting, in accordance with one or more aspects of the present disclosure.

FIGS. 8 and 9 depict flow diagrams for illustrative examples of methods 800 and 900 for memory page hinting, in accordance with one or more aspects of the present disclosure. Method 800 illustrates an example process flow from the perspective of the guest operating system and method 900 is an example process flow from the perspective of a hypervisor. Referring to FIG. 8, method 800 may be performed by processing devices of a server device or a client device and may begin at block 802. At block 802, the processing device executing a guest operating system may receive a memory page size of a hypervisor. The processing device may receive the memory page size of the hypervisor in response to a request (e.g., hypercall) transmitted to the hypervisor. The memory page size received from the hypervisor may include one or more page sizes that are supported by the hypervisor and each of the one or more page sizes may correspond to a different region of the hypervisors memory space. In one example, the memory page size of the hypervisor may be larger than the memory page size of the guest operating system and a single hypervisor memory page may include a plurality of guest memory pages. In another example, the memory page size of the hypervisor may be smaller than or equal to the memory pages size of the guest operating system and a single guest memory page may be stored within one or more hypervisor memory pages At block 804, the processing device executing the guest operating system may determine that the memory page size of the hypervisor is larger than a memory pages size of the guest operating system. This may enable a single hypervisor memory page to include the content of multiple guest memory pages. In one example, the hypervisor memory page may be a huge page (e.g., 2 MB) and the guest memory page may be a standard page (e.g., 4 KB).

At block 806, the processing device executing the guest operating system may add a guest memory page released by the guest operating system to a set of guest memory pages. The set of guest memory pages released by the guest operating system may include one or more tuples and adding the guest memory page to the set may involve adding a tuple to the set or expanding a range of an existing tuple. In one example, the guest memory page added to the set may include multiple guest memory pages that have been released by the guest operating system and that remain allocated to a virtual machine executing the guest operating system.

At block 808, the processing device executing the guest operating system may determine in view of the memory page size of the hypervisor that the set of guest memory pages fills a hypervisor memory page. The determination may involve the guest operating system determining an address of the hypervisor memory page containing the guest memory page in view of the memory page size of the hypervisor. This may involve identifying a location (e.g., virtual, logical, or physical address) of one or more of the guest memory pages and comparing it to a location (e.g., virtual, logical, or physical address) of one or more hypervisor memory pages. The guest operating system may base the determination on a hypothesis that the first page of guest memory starts at the beginning of a hypervisor page and may or may not contact the hypervisor to confirm this hypothesis. The guest operating system may then generate a message comprising the location (e.g., address) of the hypervisor memory page as opposed to the location of the guest memory page. As a result, the indication may be aligned with the memory page size of the hypervisor as opposed to the memory page size of the guest operating system.

At block 810, the processing device executing the guest operating system may provide an indication to the hypervisor that the hypervisor memory page is available for reuse. Providing the indication may be in response to the set of guest memory pages released by the guest operating system filling a hypervisor memory page or filling a predetermined threshold number of hypervisor memory pages. Filling a hypervisor memory page may involve completely filling the entire hypervisor page without having a portion of the hypervisor page in use by any guest operating system. In one example, providing the indication to the hypervisor may involve the guest operating system initiating a hypercall that transmits a message comprising a memory page identifier. In another example, providing the indication to the hypervisor may involve the guest operating system updating a shared data structure that represents the set of guest memory pages released by the guest operating system, wherein the shared data structure is modifiable by the one or more guest operating system and is accessible to the hypervisor. In either example, providing the indication that the hypervisor memory page is available for reuse may enable the hypervisor to reuse the hypervisor memory page and avoid copying content of the hypervisor memory page to persistent storage. The hypervisor memory page may be stored on a primary storage device and the persistent storage may include swap space of a secondary storage device. Responsive to completing the operations described herein above with references to block 810, the method may terminate.

Referring to FIG. 9, method 900 may be performed by processing devices of a server device or a client device and may begin at block 902. At block 902, the processing device executing a hypervisor may receive a request for a memory page size of the hypervisor. The request may be initiated by a guest operating system and received from a guest operating system managed by the hypervisor. The guest operating system may indianite the request using a hypercall.

At block 904, the processing device executing a hypervisor may transmit a memory page size of the hypervisor to a guest operating system. The processing device may provide the memory page size by responding to a request received from the guest operating system. The request may be initiated by the guest operating system using a hypercall and the hypervisor may respond with a message that includes data indicating the memory page size. The memory page size of the hypervisor may include one or more page sizes that are supported by the hypervisor and each of the one or more page sizes may correspond to a different region of the hypervisors memory space. The memory page size of the hypervisor may be larger than the memory page size of the guest operating system and a single hypervisor memory page may include a plurality of guest memory pages. In one example, the memory page of the hypervisor is filled by guest memory pages released by a single guest operating system. In another example, the memory page of the hypervisor may be filled by guest memory pages released by multiple guest operating systems.

At block 906, the processing device executing the hypervisor may determine that a memory page of the hypervisor comprises a plurality of guest memory pages released by the guest operating system. The guest memory pages released by the guest operating system may remain allocated to a virtual machine executing the guest operating system. The determination may involve receiving, from the guest operating system, an indication comprising data to determine that one or more of the hypervisor's memory pages comprise content released by the guest operating system. The data may identify at least one hypervisor memory page that includes content released by the guest operating system without including content in use by the guest operating system. In one example, the indication may involve a hypercall initiated by the guest operating system after one of the guest memory pages has been released and comprises a memory page identifier. In another example, the indication may involve a reference to a shared data structure and be received before the guest memory pages have been released. The shared data structure may represent a set of memory pages that are allocated to the virtual machine and a portion of the set that is unused by the guest operating system.

At block 908, the processing device executing the hypervisor may reallocate the memory page and avoid copying content of the memory page to persistent storage. The reallocation may be done in response to analyzing a set of hypervisor memory pages that include content that was released by one or more guest operating systems. For example, the set may include hypervisor memory pages that are allocated to a virtual machine but may have been released by the guest operating system of the virtual machine and may remain in an allocated but unused state (e.g., released). Traditionally, reallocating a memory page may involve copying content of the memory page to a backing store and clearing the memory page before reallocating it to fulfill the request for a memory page. The technology disclosed herein may enable hypervisor 120 to reallocate memory pages in a more efficient manner because the processing device may be able to detect when a hypervisor memory page that is allocated to a virtual machine is not in use by the virtual machine. As a result, a hypervisor memory page may be reallocated (e.g., reused) without copying the content of the memory page to a backing store and subsequently retrieving the content from the backing store when the original virtual machine attempts to access the memory page again. Responsive to completing the operations described herein above with references to block 908, the method may terminate.

Figure 10:
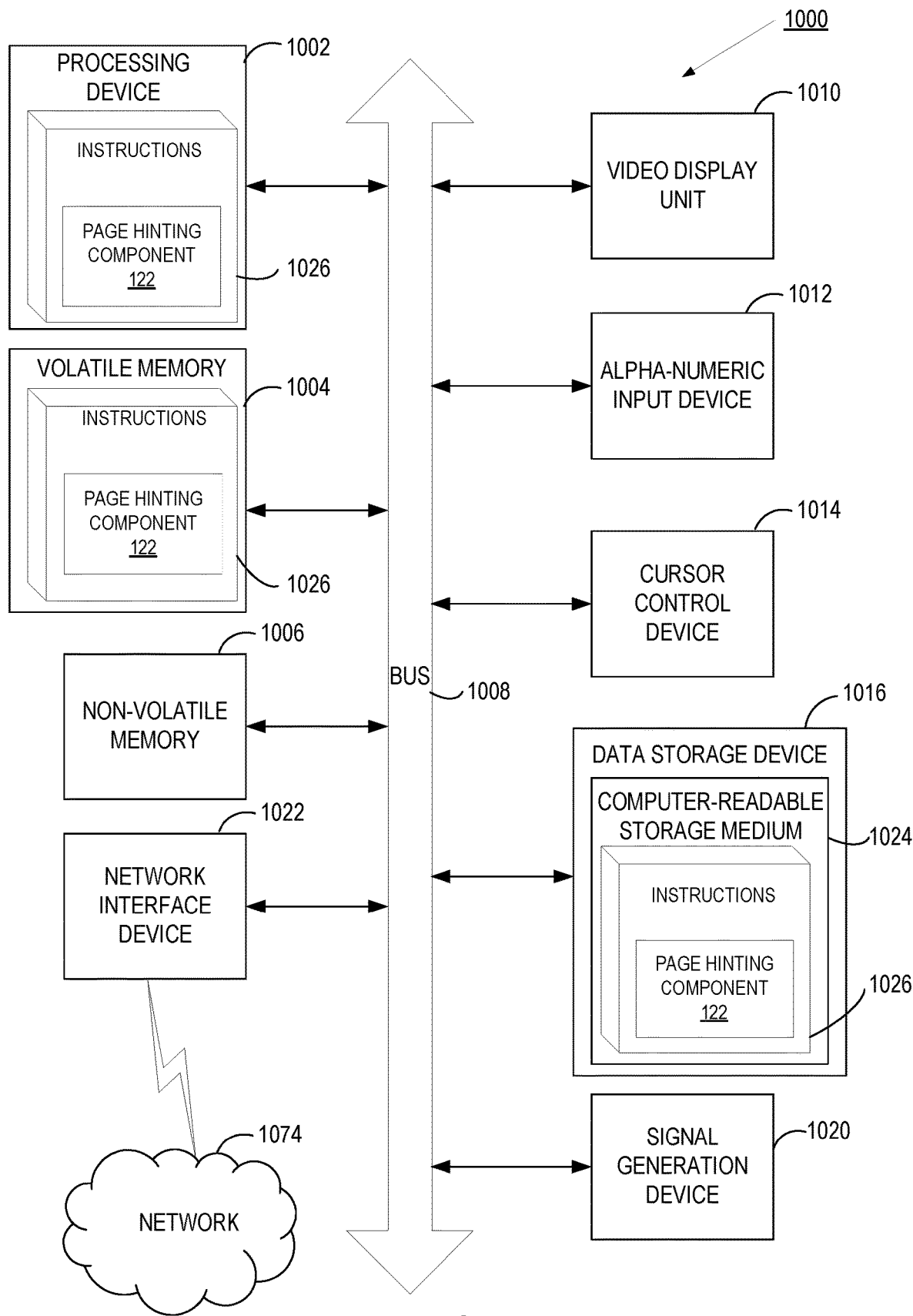
FIG. 10 depicts a block diagram of an illustrative computing device operating in accordance with the examples of the present disclosure.

FIG. 10 depicts a block diagram of a computer system operating in accordance with one or more aspects of the present disclosure. In various illustrative examples, computer system 1000 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processing device 1002, a volatile memory 1004 (e.g., random access memory (RAM)), a non-volatile memory 1006 (e.g., read-only memory (ROM) or electrically-erasable programmable ROM (EEPROM)), and a data storage device 1016, which may communicate with each other via a bus 1008.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a cursor control device 1014 (e.g., a mouse), and a signal generation device 1020.

Data storage device 1016 may include a non-transitory computer-readable storage medium 1024 on which may store instructions 1026 encoding any one or more of the methods or functions described herein, including instructions for implementing methods 300 or 500 and for encoding page hinting component 122 and modules illustrated in FIGS. 1 and 2.

Instructions 1026 may also reside, completely or partially, within volatile memory 1004 and/or within processing device 1002 during execution thereof by computer system 1000, hence, volatile memory 1004 and processing device 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: determining, by a processing device executing a guest operating system, that a memory page size of the guest operating system is different from a memory page size of a hypervisor; adding, by the guest operating system, a guest memory page released by the guest operating system to a set of guest memory pages; determining in view of the memory page size of the hypervisor that the set of guest memory pages fills a hypervisor memory page; and providing an indication to the hypervisor that the hypervisor memory page is available for reuse.

Example 2 is the method of example 1, wherein the hypervisor memory page comprises a plurality of guest memory pages that are released by the guest operating system and remain allocated to a virtual machine executing the guest operating system.

Example 3 is the method of example 1, wherein providing the indication that the hypervisor memory page is available for reuse enables the hypervisor to reuse the hypervisor memory page and avoid copying content of the hypervisor memory page to persistent storage.

Example 4 is the method of example 1, further comprising, generating, by the guest operating system, an indication aligned with the memory page size of the hypervisor, wherein the generating comprises: identifying an address of the guest memory page; determining an address of the hypervisor memory page containing the guest memory page in view of the memory page size of the hypervisor; and generating a message comprising the address of the hypervisor memory page.

Example 5 is the method of example 1, wherein providing the indication is in response to the set of guest memory pages released by the guest operating system filling the hypervisor memory page.

Example 6 is the method of example 1, wherein providing the indication is in response to the set of guest memory pages released by the guest operating system filling a plurality of hypervisor memory pages, wherein the plurality of hypervisor memory pages satisfies a predetermined threshold.

Example 7 is the method of example 1, wherein the set of guest memory pages released by the guest operating system comprises a tuple, and wherein adding the guest memory page to the set comprises expanding a range of the tuple or adding another tuple to the set.

Example 8 is method of example 1, where providing the indication to the hypervisor comprises the guest operating system initiating a hypercall that transmits a message comprising a memory page identifier of the hypervisor memory page.

Example 9 is the method of example 1, wherein providing the indication to the hypervisor comprises the guest operating system updating a shared data structure that represents a plurality of hypervisor memory pages, wherein the shared data structure is modifiable by the guest operating system and is accessible to the hypervisor.

Example 10 is the method of example 1, wherein determining the memory page size of the hypervisor comprises receiving a message from the hypervisor indicating one or more memory page sizes supported by the hypervisor.

Example 11 is a method comprising: providing, by a processing device executing a hypervisor, a memory page size of the hypervisor to a guest operating system, wherein the memory page size of the hypervisor is larger than a memory page size of the guest operating system; determining, by the hypervisor, that a memory page of the hypervisor comprises a plurality of guest memory pages released by the guest operating system, wherein the guest memory pages released by the guest operating system remain allocated to a virtual machine executing the guest operating system; and responsive to the determining, the hypervisor reallocating the memory page and avoiding copying content of the memory page to persistent storage.

Example 12 is the method of example 11, wherein the determining comprises receiving, from the guest operating system, an indication identifying one or more memory pages that comprise content released by the guest operating system.

Example 13 is the method of example 12, wherein receiving the indication comprises a hypercall initiated by the guest operating system after one of the guest memory pages has been released.

Example 14 is the method of example 12, wherein receiving the indication comprises receiving a reference to a shared data structure before the guest memory pages have been released, wherein the shared data structure represents a set of memory pages that are allocated to the virtual machine and a portion of the set that is unused by the guest operating system.

Example 15 is the method of example 11, further comprising: adding, by the hypervisor, a plurality of memory pages of the hypervisor to a set of allocated and unused memory pages, wherein the set of allocated and unused memory pages comprises a tuple; receiving a request to allocate a memory page; and selecting the memory page from the set of allocated and unused memory Example 16 is the method of example 15, wherein adding the plurality of memory pages to the set comprises expanding a range of the tuple to represent the plurality of memory pages.

Example 17 is the method of example 15, wherein adding the plurality of memory pages to the set comprises adding a plurality of tuples to the set, wherein one of the plurality of tuples corresponding to one of the plurality of memory pages.

Example 18 is the method of example 11, wherein the memory page of the hypervisor is filled by the plurality of guest memory pages released by the guest operating system.

Example 19 is the method of example 11, wherein the memory page of the hypervisor is filled by guest memory pages released by a plurality of guest operating systems.

Example 20 is a system comprising: a memory; a processing device operatively coupled to the memory, the processing device to: determine by a guest operating system, that a memory page size of the guest operating system is different from a memory page size of a hypervisor; add, by the guest operating system, a guest memory page released by the guest operating system to a set of guest memory pages; determine in view of the memory page size of the hypervisor that the set of guest memory pages fills a hypervisor memory page; and providing an indication to the hypervisor that the hypervisor memory page is available for reuse.

Example 21 is the system of example 20, wherein the hypervisor memory page comprises a plurality of guest memory pages that are released by the guest operating system and remain allocated to a virtual machine executing the guest operating system.

Example 22 is the system of example 20, wherein to provide the indication that the hypervisor memory page is available for reuse enables the hypervisor to reuse the hypervisor memory page and avoid copying content of the hypervisor memory page to persistent storage.

Example 23 is the system of example 20, wherein the processing device is further to generate, by the guest operating system, an indication aligned with the memory page size of the hypervisor.

Example 24 is the system of example 20, wherein to provide the indication is in response to the set of guest memory pages released by the guest operating system filling the hypervisor memory page.

Example 25 is a system comprising: a memory; a processing device operatively coupled to the memory, the processing device to: provide, by a hypervisor, a memory page size of the hypervisor to a guest operating system, wherein the memory page size of the hypervisor is larger than a memory page size of the guest operating system; determine, by the hypervisor, that a memory page of the hypervisor comprises a plurality of guest memory pages released by the guest operating system, wherein the guest memory pages released by the guest operating system remain allocated to a virtual machine executing the guest operating system; and responsive to the determining, the hypervisor reallocating the memory page and avoiding copying content of the memory page to persistent storage.

Example 26 is the system of example 25, wherein to determine, the processing device is to receive, from the guest operating system, an indication identifying one or more memory pages that comprise content released by the guest operating system.

Example 27 is the system of example 26, wherein to receive the indication, the processing device is to receive a hypercall initiated by the guest operating system after one of the guest memory pages has been released.

Example 28 is the system of example 26, wherein to receive the indication, the processing device is to receive a reference to a shared data structure before the guest memory pages have been released, wherein the shared data structure represents a set of memory pages that are allocated to the virtual machine and a portion of the set that is unused by the guest operating system.

Example 29 is the system of example 25, further comprising: add, by the hypervisor, a plurality of memory pages of the hypervisor to a set of allocated and unused memory pages, wherein the set of allocated and unused memory pages comprises a tuple; receive a request to allocate a memory page; and select the memory page from the set of allocated and unused memory Example 30 is a non-transitory machine-readable storage medium storing instructions that cause a processing device to: receive, by a processing device executing a guest operating system, a memory page size of a hypervisor; determine, by the guest operating system, that the memory page size of the hypervisor is larger than a memory page size of the guest operating system; add, by the guest operating system, a guest memory page released by the guest operating system to a set of guest memory pages; determine in view of the memory page size of the hypervisor that the set of guest memory pages fills a hypervisor memory page; and responsive to the set of guest memory pages filling the hypervisor page, provide an indication to the hypervisor that the hypervisor memory page is available for reuse.

Example 31 is a non-transitory machine-readable storage medium storing instructions that cause a processing device to: receive, by a processing device executing a hypervisor, a request for a memory page size of the hypervisor; transmit, by the hypervisor, the memory page size of the hypervisor to a guest operating system, wherein the memory page size of the hypervisor is larger than a memory page size of the guest operating system; determine, by the hypervisor, that a memory page of the hypervisor comprises a plurality of guest memory pages released by the guest operating system, wherein the guest memory pages released by the guest operating system remain allocated to a virtual machine executing the guest operating system; reallocate, by the hypervisor, the memory page and avoiding copying content of the memory page to persistent storage.

Example 32 is an apparatus comprising: means for determining, by a guest operating system, that a memory page size of the guest operating system is different from a memory page size of a hypervisor; means for adding, by the guest operating system, a guest memory page released by the guest operating system to a set of guest memory pages; means for determining in view of the memory page size of the hypervisor that the set of guest memory pages fills a hypervisor memory page; and providing an indication to the hypervisor that the hypervisor memory page is available for reuse.

Example 33 is an apparatus comprising: means for providing, by a hypervisor, a memory page size of the hypervisor to a guest operating system, wherein the memory page size of the hypervisor is larger than a memory page size of the guest operating system; means for determining a memory page of the hypervisor comprises a plurality of guest memory pages released by the guest operating system, wherein the guest memory pages released by the guest operating system remain allocated to a virtual machine executing the guest operating system; and means for reallocating the memory page and avoiding copying content of the memory page to persistent storage.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "identifying," "adding," "providing," "reallocating," "generating," "receiving," "selecting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    determining, by a guest operating system, that a memory page size of a hypervisor is larger than a memory page size of the guest operating system;
    adding, by the guest operating system, a guest memory page released by the guest operating system to a set of guest memory pages;
    determining, by the guest operating system, that multiple guest memory pages of the set are located within a hypervisor memory page and entirely fill the hypervisor memory page; and
    providing, by the guest operating system, an indication to the hypervisor that the hypervisor memory page is available for reuse.

2. The method of claim 1, wherein the hypervisor memory page comprises guest memory pages that are released by the guest operating system and remain allocated to a virtual machine executing the guest operating system.

3. The method of claim 1, wherein providing the indication that the hypervisor memory page is available for reuse enables the hypervisor to reuse the hypervisor memory page and avoid copying content of the hypervisor memory page to persistent storage.

4. The method of claim 1, further comprising, generating, by the guest operating system, an indication aligned with the memory page size of the hypervisor, wherein the generating comprises:
    identifying an address of the guest memory page;
    determining an address of the hypervisor memory page containing the guest memory page in view of the memory page size of the hypervisor; and
    generating a message comprising the address of the hypervisor memory page.

5. The method of claim 1, wherein providing the indication is in response to the determining that the multiple guest memory pages of the set entirely fill the hypervisor memory page.

6. The method of claim 1, wherein providing the indication is in response to the set of guest memory pages filling a plurality of hypervisor memory pages, wherein the plurality of hypervisor memory pages satisfies a predetermined threshold.

7. The method of claim 1, wherein the set of guest memory pages comprises a tuple, and wherein adding the guest memory page to the set comprises expanding a range of the tuple or adding another tuple to the set.

8. The method of claim 1, where providing the indication to the hypervisor comprises the guest operating system initiating a hypercall that transmits a message comprising a memory page identifier of the hypervisor memory page.

9. The method of claim 1, wherein providing the indication to the hypervisor comprises the guest operating system updating a shared data structure that represents a plurality of hypervisor memory pages, wherein the shared data structure is modifiable by the guest operating system and is accessible to the hypervisor.

10. The method of claim 1, wherein determining the memory page size of the hypervisor comprises receiving a message from the hypervisor indicating one or more memory page sizes supported by the hypervisor.

11. A non-transitory machine-readable storage medium storing instructions that cause a processing device to:
receive, by a guest operating system, an indication of a memory page size of a hypervisor;
determine, by the guest operating system, that the memory page size of the hypervisor is larger than a memory page size of the guest operating system;
add, by the guest operating system, a guest memory page released by the guest operating system to a set of guest memory pages;
determine, by the guest operating system, that multiple guest memory pages of the set are located within a hypervisor memory page and entirely fill the hypervisor memory page; and
provide an indication to the hypervisor that the hypervisor memory page is available for reuse.

12. The non-transitory machine-readable storage medium of claim 11, wherein the hypervisor memory page comprises guest memory pages that are released by the guest operating system and remain allocated to a virtual machine executing the guest operating system.

13. The non-transitory machine-readable storage medium of claim 11, wherein to provide the indication that the hypervisor memory page is available for reuse enables the hypervisor to reuse the hypervisor memory page and avoid copying content of the hypervisor memory page to persistent storage.

14. The non-transitory machine-readable storage medium of claim 11, wherein the processing device is further to generate, by the guest operating system, an indication aligned with the memory page size of the hypervisor, and wherein to generate comprises the processing device to:
identify an address of the guest memory page;
determine an address of the hypervisor memory page containing the guest memory page in view of the memory page size of the hypervisor; and
generate a message comprising the address of the hypervisor memory page.

15. The non-transitory machine-readable storage medium of claim 11, wherein the set of guest memory pages comprises a tuple, and wherein adding the guest memory page to the set comprises expanding a range of the tuple or adding another tuple to the set.

16. A system comprising:
a memory;
a processing device operatively coupled to the memory, the processing device to:
determine, by a guest operating system, that a memory page size of a hypervisor is larger than a memory page size of the guest operating system;
add, by the guest operating system, a guest memory page released by the guest operating system to a set of guest memory pages;
determine, by the guest operating system, that multiple guest memory pages of the set are located within a hypervisor memory page and entirely fill the hypervisor memory page; and
provide, by the guest operating system, an indication to the hypervisor that the hypervisor memory page is available for reuse.

17. The system of claim 16, wherein the hypervisor memory page comprises guest memory pages that are released by the guest operating system and remain allocated to a virtual machine executing the guest operating system.

18. The system of claim 16, wherein providing the indication that the hypervisor memory page is available for reuse enables the hypervisor to reuse the hypervisor memory page and avoid copying content of the hypervisor memory page to persistent storage.

19. The system of claim 16, further comprising, generating, by the guest operating system, an indication aligned with the memory page size of the hypervisor, wherein the generating comprises:
identifying an address of the guest memory page;
determining an address of the hypervisor memory page containing the guest memory page in view of the memory page size of the hypervisor; and
generating a message comprising the address of the hypervisor memory page.

20. The system of claim 16, wherein providing the indication is in response to the determining that the multiple guest memory pages of the set entirely fill the hypervisor memory page.

* * * * *